United States Patent
Sun

(10) Patent No.: US 12,096,251 B2
(45) Date of Patent: Sep. 17, 2024

(54) SERVICE CONTINUITY IMPLEMENTATION METHOD, APPARATUS, AND SYSTEM

(71) Applicant: HUAWEI TECHNOLOGIES CO., LTD., Shenzhen (CN)

(72) Inventor: Haiyang Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 478 days.

(21) Appl. No.: 17/370,956

(22) Filed: Jul. 8, 2021

(65) Prior Publication Data

US 2021/0337404 A1 Oct. 28, 2021

Related U.S. Application Data

(63) Continuation of application No. PCT/CN2019/116859, filed on Nov. 8, 2019.

(30) Foreign Application Priority Data

Jan. 10, 2019 (CN) .......................... 201910022921.0

(51) Int. Cl.
G06F 21/00 (2013.01)
H04L 41/50 (2022.01)
(Continued)

(52) U.S. Cl.
CPC ......... *H04W 24/04* (2013.01); *H04L 41/5019* (2013.01); *H04L 41/5032* (2013.01);
(Continued)

(58) Field of Classification Search
CPC . H04W 24/04; H04W 28/0268; H04W 28/24; H04W 72/23; H04W 4/24;
(Continued)

(56) References Cited

U.S. PATENT DOCUMENTS

2013/0040685 A1* 2/2013 Li ......................... H04M 15/64
455/517
2017/0359768 A1* 12/2017 Byun .................... H04W 72/20
(Continued)

FOREIGN PATENT DOCUMENTS

CN 103491572 A * 1/2014 ............ H04W 28/06
CN 108702724 A 10/2018
(Continued)

OTHER PUBLICATIONS

Sa1, Reply LS on Urllc. 3GPP Tsg Ran WG2#102, Busan, Korea, May 21 - 25, 2018, R2-1808779, 3 pages.
(Continued)

*Primary Examiner* — Kendall Dolly
(74) *Attorney, Agent, or Firm* — HAUPTMAN HAM, LLP

(57) ABSTRACT

Embodiments of this application provide a service continuity implementation method, an apparatus, and a system, to ensure service continuity in an application layer data packet transmission process. The method includes: receiving, by a session management network element, first survival time information from a policy control network element, where the first survival time information indicates duration of a service that survives when a correct data packet is not received; determining, by the session management network element, the first survival time information as a binding parameter of a quality of service QoS flow; and sending, by the session management network element, second survival time information to an access network device, where the second survival time information is used to indicate the duration; and after receiving the second survival time information from the session management network element, scheduling, by the access network device, a data packet based on the second survival time formation.

20 Claims, 18 Drawing Sheets

(51) Int. Cl.
    *H04L 41/5019*    (2022.01)
    *H04W 24/04*     (2009.01)
    *H04W 28/02*     (2009.01)
    *H04W 28/24*     (2009.01)
    *H04W 72/23*     (2023.01)
(52) U.S. Cl.
    CPC ....... *H04W 28/0268* (2013.01); *H04W 28/24* (2013.01); *H04W 72/23* (2023.01)
(58) Field of Classification Search
    CPC ......... H04W 28/0263; H04W 28/0908; H04W 28/0925; H04W 72/1221; H04W 76/20; H04L 41/5019; H04L 41/5032; H04L 12/1407; H04L 47/805; H04L 47/826; H04M 15/66; H04M 15/8016; H04M 15/8228
    See application file for complete search history.

(56) References Cited

U.S. PATENT DOCUMENTS

| | | | | |
|---|---|---|---|---|
| 2018/0262924 | A1* | 9/2018 | Dao | H04W 72/535 |
| 2019/0215730 | A1* | 7/2019 | Qiao | H04W 28/0268 |
| 2020/0145876 | A1* | 5/2020 | Dao | H04L 12/1407 |
| 2020/0195539 | A1* | 6/2020 | Sivaraj | G06N 20/20 |
| 2021/0274585 | A1* | 9/2021 | Yu | H04W 28/0236 |

FOREIGN PATENT DOCUMENTS

| | | |
|---|---|---|
| CN | 109150808 A | 1/2019 |
| CN | 109151913 A | 1/2019 |

OTHER PUBLICATIONS

Huawei, Discussion on the Oas enhancement for lloT. 3GPP Tsg-Ran WG2 #102, Spokane, USA, 12 Nov - Nov. 16, 2018, R3-186979, 3 pages.

Bgpp Ts 23.502 V15.4.0 (2018-12), 3rd Generation Partnership Project; Technical Specification Group Services and System Aspects; Procedures for the 5G System; Stage 2(Release 15), 346 pages.
European Search Report issued in corresponding European Application No. 19908521.8, dated Jan. 25, 2022, bages 1-12.
Chinese Office Action issued in corresponding Chinese Application No. 201910022921.0, dated Apr. 25, 2022, pp. 1-25.
3GPP TS 23.501 V15.4.0 (Dec. 2018), 3rd Generation Partnership Project; Technical Specification Group Services and System Aspects; System Architecture for the 5G System; Stage 2(Release 15), 236 pages.
3GPP TS 23.203 V15.4.0 (Sep. 2018), 3rd Generation Partnership Project; Technical Specification Group Services and System Aspects; Policy and charging control architecture(Release 15), 261 pages.
3GPP TS 22.261 V16.6.0 (Dec. 2018), 3rd Generation Partnership Project; Technical Specification Group Services and System Aspects; Service requirements for the 5G system; Stage 1(Release 16), 72 pages.
International Search Report issued in corresponding International Application No. PCT/CN2019/116859, dated Jan. 23, 2020, pp. 1-8.
3GPP TS 38.300 V15.3.1 (Oct. 2018), 3rd Generation Partnership Project; Technical Specification Group Radio Access Network; NR; NR and NG-RAN Overall Description; Stage 2(Release 15), 92 pages.
3GPP T 29.500 V15.2.1 (Dec. 2018), 3rd Generation Partnership Project; Technical Specification Group Core Network and Terminals; 5G System; Technical Realization of Service Based Architecture; Stage 3(Release 15), 32 pages.
3GPP TS 33.501 V15.3.1 (Dec. 2018), 3rd Generation Partnership Project; Technical Specification Group Services and System Aspects; Security architecture and procedures for 5G system(Release 15), 182 pages.
3GPP TS 23.503 V15.4.0 (Dec. 2018), 3rd Generation Partnership Project; Technical Specification Group Services and System Aspects; Policy and Charging Control Framework for the 5G System; Stage 2(Release 15), 76 pages.
3GPP TS 22.104 V16.0.0 (Dec. 2018), 3rd Generation Partnership Project; Technical Specification Group Services and System Aspects; Service requirements for cyber-physical control applications in vertical domains; Stage 1(Release 16), 55 pages.

* cited by examiner

SERVICE CONTINUITY IMPLEMENTATION METHOD, APPARATUS, AND SYSTEM

CROSS-REFERENCE TO RELATED APPLICATIONS

This application is a continuation of International Patent Application No. PCT/CN2019/116859, filed on Nov. 8, 2019, which claims priority to Chinese Patent Application No. 201910022921.0, filed on Jan. 10, 2019. The disclosures of the aforementioned applications are hereby incorporated by reference in their entireties.

TECHNICAL FIELD

This application relates to the field of communications technologies, and in particular, to a service continuity implementation method, an apparatus, and a system.

BACKGROUND

To face challenges from wireless broadband technologies and keep leading advantages of a 3rd generation partnership project (3GPP) network, the 3GPP standard group formulated a next generation mobile communications system (next generation system) network architecture at the end of 2016, which is referred to as a 5th generation (5G) network architecture.

In the 5G network architecture, an ultra-reliable low-latency communication (URLLC) scenario is defined, and mainly includes services such as unmanned driving and industrial automation that require low-latency and high-reliable connections. To meet an application layer requirement, a network layer transmits an application layer service data packet (briefly referred to as an application layer data packet) based on a quality of service (QoS) requirement of an application layer service. For example, in research of 3GPP release (release, Rel) 15, an air interface indicator is set as a requirement that a 1-ms delay plus 99.999% reliability needs to be ensured on a user plane. This means that the following case needs to be ensured: At least 99,999 packet data convergence protocol (PDCP) service data units (SDU) in 100,000 PDCP SDUs that are transmitted through an air interface on the user plane are successfully transmitted within 1 ms. Otherwise, an application layer is interrupted, and consequently a normal application layer service is affected.

However, currently, there is no related solution for ensuring service continuity in an application layer data packet transmission process.

SUMMARY

Embodiments of this application provide a service continuity implementation method, an apparatus, and a system, to ensure service continuity in an application layer data packet transmission process.

To achieve the foregoing objective, the following technical solutions are used in the embodiments of this application.

According to a first aspect, a service continuity implementation method and a corresponding communications apparatus are provided. In this solution, a session management network element receives first survival time information from a policy control network element, where the first survival time information indicates duration of a service that survives when a correct data packet is not received. The session management network element determines the first survival time information as a binding parameter of a quality of service QoS flow. The session management network element sends second survival time information to an access network device, where the second survival time information is used to indicate the duration, and the second survival time information is used by the access network device to schedule a data packet. Based on this solution, the access network device may receive the second survival time information from the session management network element, and the second survival time information indicates the duration of the service that survives when the correct data packet is not received. Therefore, the access network device can schedule the data packet based on the second survival time information. In an application layer data packet transmission process, this can avoid problems that an application layer is interrupted and a normal application layer service is affected because a network layer does not transmit an application layer data packet based on a QoS requirement of an application layer service, and can ensure service continuity.

In a possible design, the first survival time information includes survival time or an identifier of the survival time; and the second survival time information includes the survival time or the identifier of the survival time.

In a possible design, that a session management network element receives first survival time information from a policy control network element includes: The session management network element receives a policy control PCC rule from the policy control network element, where the PCC rule includes the first survival time information.

In a possible design, that a session management network element receives first survival time information from a policy control network element includes: The session management network element receives a policy control PCC rule from the policy control network element, where the PCC rule includes a QoS identifier, and a QoS attribute corresponding to the QoS identifier includes the first survival time information.

In a possible design, that the session management network element determines the survival time information as a binding parameter of a QoS flow includes: The session management network element determines the PCC rule as a PCC rule bound to the QoS flow.

In a possible design, the PCC rule is an updated PCC rule, and the first survival time information is updated survival time information. Based on this solution, the first survival time information can be updated in a timely manner.

In a possible design, that the session management network element sends second survival time information to an access network device includes: The session management network element sends a QoS file to the access network device, where the QoS file includes the second survival time information. In other words, the session management network element may send the second survival time information to the access network device through a control plane.

In a possible design, that the session management network element sends second survival time information to an access network device includes: The session management network element sends the second survival time information to a user plane network element, where the user plane network element uses a downlink data packet to be sent to the access network device to carry the second survival time information. In other words, the session management network element may send the second survival time information to the access network device through a user plane.

In a possible design, the solution further includes: The session management network element sends a QoS rule to a terminal device, where the QoS rule includes third survival time information, the third survival time information is used to indicate the duration, and the third survival time information in the QoS rule is used by the terminal device to schedule a data packet. Based on this solution, the terminal device may receive the third survival time information from the session management network element, and the third survival time information indicates the duration of the service that survives when the correct data packet is not received. Therefore, the terminal device can schedule the data packet based on the third survival time information. In an application layer data packet transmission process, this can avoid problems that an application layer is interrupted and a normal application layer service is affected because a network layer does not transmit an application layer data packet based on a QoS requirement of an application layer service, and can ensure service continuity.

According to a second aspect, a service continuity implementation method and a corresponding communications apparatus are provided. In this solution, a terminal device receives survival time information from an access network device, where the survival time information indicates duration of a service that survives when a correct data packet is not received. The terminal device schedules a data packet based on the survival time information. Based on this solution, the terminal device may receive the survival time information from a session management network element, and the survival time information indicates the duration of the service that survives when the correct data packet is not received. Therefore, the terminal device can schedule the data packet based on the survival time information. In an application layer data packet transmission process, this can avoid problems that an application layer is interrupted and a normal application layer service is affected because a network layer does not transmit an application layer data packet based on a QoS requirement of an application layer service, and can ensure service continuity.

In a possible design, the survival time information includes survival time or an identifier of the survival time.

In a possible design, that a terminal device receives survival time information from an access network device includes: The terminal device receives a QoS rule from the access network device, where the QoS rule includes the survival time information, and the QoS rule is sent by a mobility management network element to the access network device. In other words, the survival time information is sent to the terminal device through a control plane.

In a possible design, that a terminal device receives survival time information from an access network device includes: The terminal device receives a downlink data packet from the access network device, where the downlink data packet includes the survival time information. In other words, the survival time information is sent to the terminal device through a user plane.

In a possible design, the solution further includes: The terminal device sends an uplink data packet to the access network device, where the uplink data packet includes the survival time information.

According to a third aspect, a communications apparatus is provided, to implement the foregoing methods. The communications apparatus may be the session management network element in the first aspect, or an apparatus including the session management network element. Alternatively, the communications apparatus may be the terminal device in the second aspect, or an apparatus including the terminal device. The communications apparatus includes a corresponding module, unit, or means (means) for implementing the foregoing methods. The module, unit, or means may be implemented by hardware or software, or implemented by hardware executing corresponding software. The hardware or the software includes one or more modules or units corresponding to the foregoing functions.

According to a fourth aspect, a communications apparatus is provided, and includes a processor and a memory. The memory is configured to store computer instructions, and when the processor executes the instructions, the communications apparatus is enabled to perform the method according to either of the foregoing aspects. The communications apparatus may be the session management network element in the first aspect, or an apparatus including the session management network element. Alternatively, the communications apparatus may be the terminal device in the second aspect, or an apparatus including the terminal device.

According to a fifth aspect, a communications apparatus is provided, and includes a processor. The processor is configured to: be coupled to a memory, and after reading instructions in the memory, perform the method according to either of the foregoing aspects according to the instructions. The communications apparatus may be the session management network element in the first aspect, or an apparatus including the session management network element. Alternatively, the communications apparatus may be the terminal device in the second aspect, or an apparatus including the terminal device.

According to a sixth aspect, a computer readable storage medium is provided. The computer readable storage medium stores instructions. When the instructions are run on a computer, the computer is enabled to perform the method according to either of the foregoing aspects.

According to a seventh aspect, a computer program product including instructions is provided. When the computer program product runs on a computer, the computer is enabled to perform the method according to either of the foregoing aspects.

According to an eighth aspect, a communications apparatus (for example, the communications apparatus may be a chip or a chip system) is provided. The communications apparatus includes a processor, configured to implement the functions according to either of the foregoing aspects. In a possible design, the communications apparatus further includes a memory. The memory is configured to store program instructions and data that are necessary. When the communications apparatus is the chip system, the communications apparatus may include a chip, or may include a chip and another discrete component.

For technical effects brought by any design manner of the third aspect to the eighth aspect, refer to the technical effects brought by different design manners of the first aspect or the second aspect. Details are not described herein again.

According to a ninth aspect, a communications system is provided. The communications system includes a session management network element and an access network device. The session management network element is configured to receive first survival time information from a policy control network element, where the first survival time information indicates duration of a service that survives when a correct data packet is not received. The session management network element is further configured to determine the first survival time information as a binding parameter of a quality of service QoS flow. The session management network element is further configured to send second survival time information to the access network device, where the second survival time information is used to indicate the duration. The access network device is configured to: receive the second survival time information from the session management network element, schedule a data packet based on the second survival time formation.

In a possible design, the session management network element is further configured to perform the method according to any possible design of the first aspect.

For technical effects brought by any design manner of the ninth aspect, refer to the technical effects brought by different design manners of the first aspect. Details are not described herein again.

DESCRIPTION OF EMBODIMENTS

For ease of understanding solutions in the embodiments of this application, related concepts are first briefly described as follows:

(1) Protocol Data Unit (PDU) Session

The PDU session is an association between a terminal device and a data network (DN), and is used to provide a PDU connection service.

(2) QoS Parameter

The QoS parameter in the embodiments of this application includes one or more of the following parameters:

1. 5G QoS identifier (5QI)

The 5QI is a scalar used to be indexed to a corresponding 5G QoS characteristic. The 5QIs are classified into a standardized 5QI, a preconfigured 5QI, and a dynamically allocated 5QI. The standardized 5QIs are in a one-to-one correspondence with a group of standardized 5G QoS characteristic values. A 5G QoS characteristic value corresponding to the preconfigured 5QI is preconfigured on an access network device. A 5G QoS characteristic value corresponding to the dynamically allocated 5QI is sent by a core network device to the access network device by using a QoS profile (QoS profile).

2. Allocation and Retention Priority (ARP)

The ARP includes a priority level, a preemption capability, and a preemption vulnerability.

3. Guaranteed Flow Bit Rate (GFBR)

The GFBR represents a bit rate that is expected to be provided for a guaranteed bit rate (GBR) QoS flow (flow).

4. Maximum Flow Bit Rate (MFBR)

The MFBR is used to limit a bit rate provided for a GBR QoS flow, namely, a maximum bit rate provided for the GBR QoS flow. If the bit rate is exceeded, a data packet can be discarded.

5. Reflective QoS Attribute (RQA)

The RQA is used to indicate a service transmitted through a corresponding QoS flow to use reflective QoS.

6. Notification Control (NC)

The NC is used to indicate whether an access network device notifies a network in a use period of a QoS flow when a GFBR cannot be met.

(3) QoS Model

Figure 1:
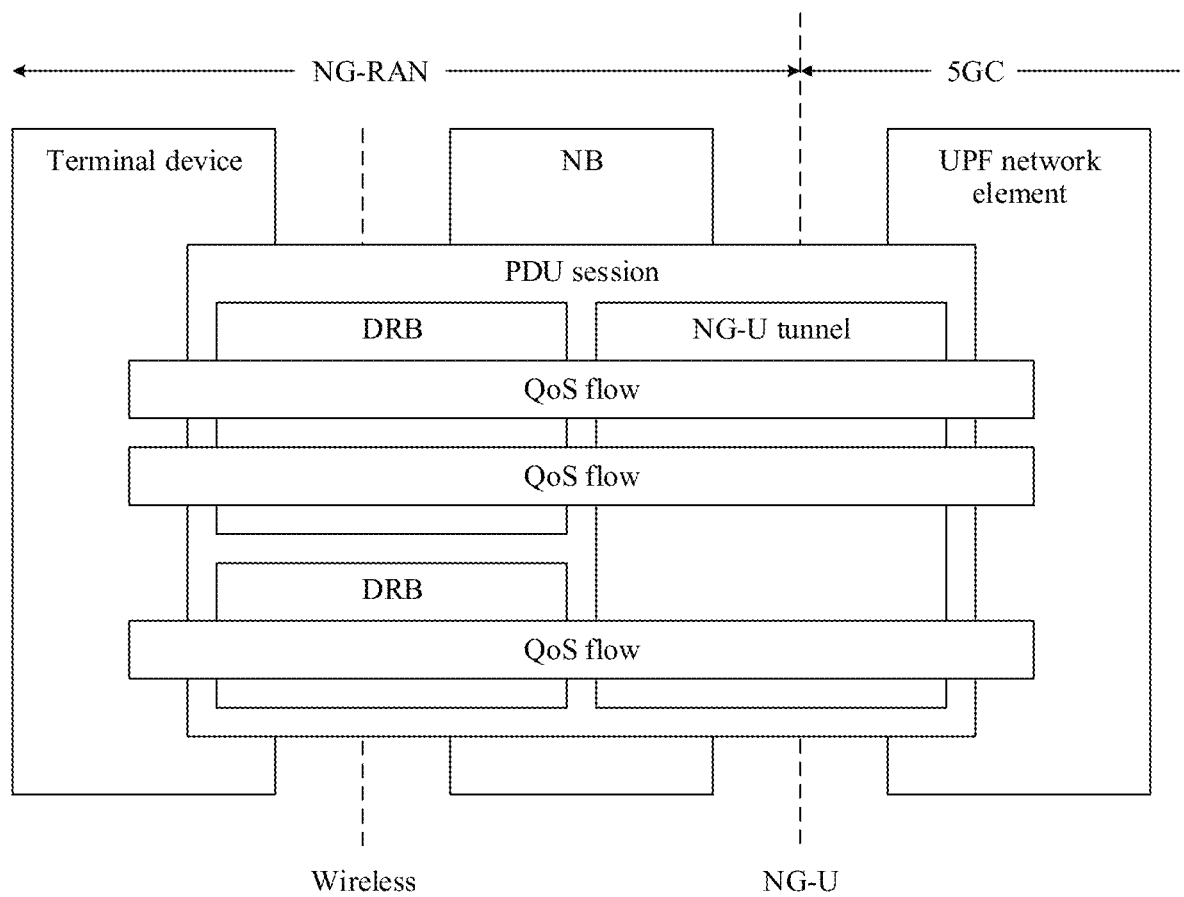
FIG. 1 shows an existing 5G QoS model.

In a 5G system, to ensure end-to-end quality of service of a service, a 5G QoS model based on a QoS flow (flow) is proposed, and is shown in FIG. 1. The 5G QoS model supports a guaranteed bit rate QoS flow (that is, a guaranteed bit rate (GBR) QoS flow) and a non-guaranteed bit rate QoS flow (that is, a non-GBR (non-GBR) QoS flow). Same transmission processing (such as scheduling or an admission threshold) is performed on data packets controlled by using a same QoS flow.

As shown in FIG. 1, a terminal device may establish one or more PDU sessions with a 5G network. One or more QoS flows may be established in each PDU session. Each QoS flow is identified by a QoS flow identifier (QFI), and the QFI uniquely identifies a QoS flow in a session. In addition, each QoS flow corresponds to one data radio bearer (DRB), and one DRB may correspond to one or more QoS flows.

Whether a QoS flow is a GBR QoS flow or a non-GBR QoS flow is determined based on a corresponding QoS profile (QoS profile).

A QoS profile corresponding to a GBR QoS flow needs to include the following QoS parameters: a 5QI, an ARP, a GFBR, and an MFBR, and optionally includes NC. Based on whether the QoS profile includes the NC, the GBR QoS flows are classified into a GRB QoS flow that requires notification control and a GBR QoS flow that does not require notification control. For the GBR QoS flow that requires notification control, when an access network device detects that a corresponding QoS flow resource cannot be met, the access network device notifies a session management function (SMF) network element of the event. Further, the SMF network element may initiate a QoS flow deletion or modification procedure.

A QoS file corresponding to a non-GBR QoS flow needs to include the following QoS parameters: a 5QI and an ARP, and optionally includes an RQA.

Figure 2:
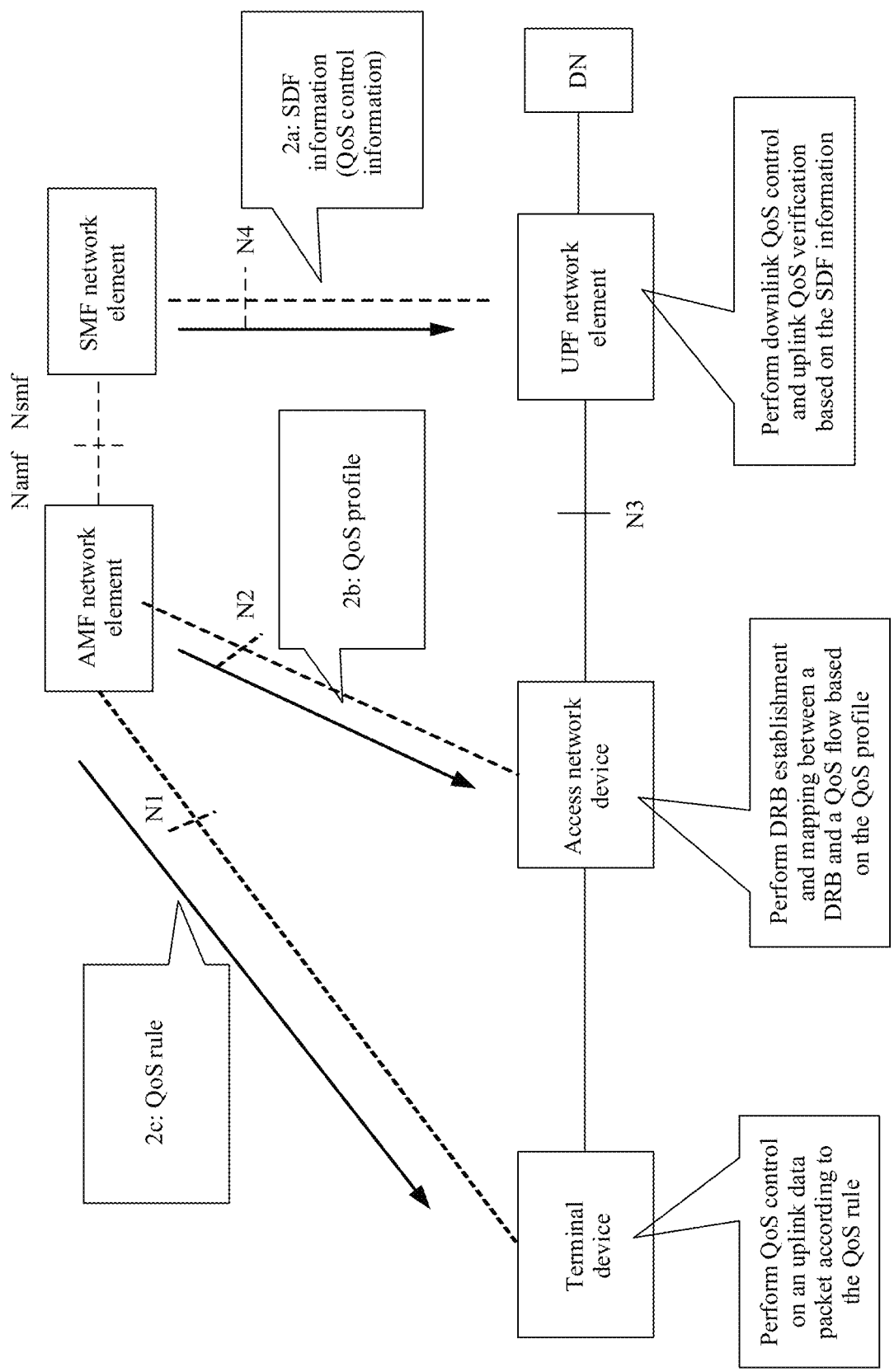
FIG. 2 is a schematic diagram of an existing architecture of establishing a signaling-based QoS flow.

In addition, the GBR QoS flow is mainly controlled in a signaling-based manner. A corresponding QoS flow establishment procedure is shown in FIG. 2, and includes the following steps:

Step 1: If the SMF network element determines, according to a local policy or a policy and charging control (PCC) rule sent by a policy control function (PCF) network element, to establish a QoS flow, the following operations are performed: 2a: The SMF network element sends service data flow (SDF) information to a user plane function (UPF) network element, where the SDF information includes QoS control information. 2b: The SMF network element sends a QoS profile corresponding to the QoS flow to the access network device by using an access and mobility management function (AMF) network element. 2c: The SMF network element sends a QoS rule (QoS rule) to the terminal device by using the AMF network element and the access network device, where the QoS rule includes QoS control information.

Step 2: The terminal device, the access network device, and the UPF network element establish the QoS flow. The access network device establishes a DRB on an air interface based on the QoS profile, and stores a binding relationship between the QoS flow and the DRB.

On a downlink, when receiving a downlink data packet, the UPF network element uses a data packet header of the downlink data packet to carry a QFI based on the SDF information sent by the SMF network element. When receiving the downlink data packet, the access network device transmits the downlink data packet through a corresponding DRB based on the QFI in the data packet header and a corresponding binding relationship between a QoS flow and a DRB.

On an uplink, when determining to send an uplink data packet, the terminal device determines the QoS flow according to a QoS rule, uses a data packet header of the to-be-sent uplink data packet to carry a QFI, and transmits the uplink data packet through a corresponding DRB based on a binding relationship between a QoS flow and a DRB. When receiving the uplink data packet, the access network device uses a data packet header of an uplink data packet between the access network device and the UPF network element to carry the QFI based on the QFI in the data packet header. When receiving the uplink data packet sent by the access network device, the UPF network element verifies whether the data packet is transmitted through a correct QoS flow.

(4) Binding Mechanism (Binding Mechanism)

The binding mechanism is the procedure that associates a service data flow (defined in a PCC rule by means of the SDF template), to the QoS flow deemed to transport the service data flow (English: The binding mechanism is the procedure that associates a service data flow (defined in a PCC rule by means of the SDF template), to the QoS Flow deemed to transport the service data flow).

The binding mechanism includes the following three steps:

Step 1: Session binding (session binding): Application function (AF) sessions (session) are in a one-to-one correspondence with PDU sessions. For details, refer to an existing implementation. Details are not described herein.

Step 2: PCC rule authorization (PCC rule authorization): A PCF network element performs PCC rule authorization to authorize a PCC rule and allocate a QoS parameter to the PCC rule. For details, refer to an existing implementation. Details are not described herein.

Step 3: QoS flow binding (QoS flow binding): QoS flow binding is the association of a PCC rule to a QoS flow within a PDU session. The binding is performed using the following binding parameters (English: QoS flow binding is the association of a PCC rule to a QoS Flow within a PDU Session. The binding is performed using the following binding parameters).

1. 5QI: For related descriptions, refer to the foregoing QoS parameter part. Details are not described herein again.

2. ARP: For related descriptions, refer to the foregoing QoS parameter part. Details are not described herein again.

Alternatively, optionally, if the PCC rule includes one or more of the following parameters, the one or more of the following parameters may also be used as the binding parameter:

3. QoS notification control (QNC)

The QNC is used to indicate whether an access network device notifies a network in a use period of a QoS flow when a GFBR cannot be met.

4. Priority level (priority level)

The priority level indicates a priority in scheduling resources among QoS flows. The priority level is used to distinguish between QoS flows from a same terminal device, and is further used to distinguish between QoS flows from different terminal devices.

5. Averaging window (averaging window)

The averaging window is used for only a GBR QoS flow and represents duration over which a GFBR and an MFBR are calculated.

6. Maximum data burst volume (MDBV)

The MDBV represents a largest amount of data that is required to be served by a 5G access network within a packet delay budget (PDB). The PDB defines an upper limit of a time that can be delayed for transmitting a data packet between a terminal device and a UPF network element with an N6 interface.

Certainly, the priority level, the averaging window, or the maximum data burst volume may alternatively be a parameter in a QoS attribute corresponding to the 5QI. This is not specifically limited herein.

The following describes technical solutions in the embodiments of this application with reference to the accompanying drawings in the embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions of this application means two or more. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural. In addition, to clearly describe the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 3:
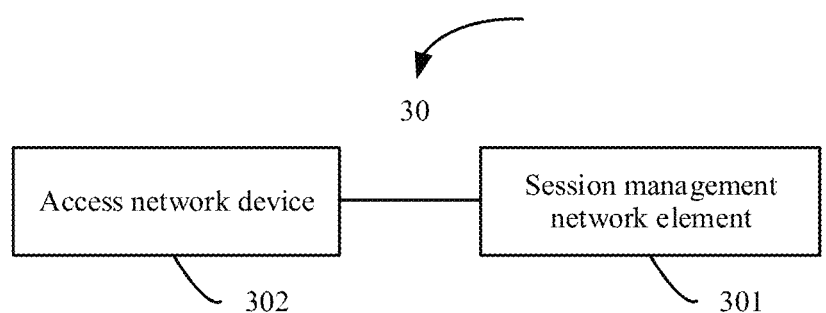
FIG. 3 is a schematic architectural diagram of a communications system according to an embodiment of this application.

FIG. 3 shows a communications system 30 according to an embodiment of this application. The communications system 30 includes an access network device 302 and a session management network element 301. The session management network element 301 receives first survival time (survival time) information from a policy control network element, and determines the first survival time information as a binding parameter of a QoS flow, where the first survival time information indicates duration of a service that survives when a correct data packet is not received. The session management network element 301 sends second survival time information to the access network device 302, where the second survival time information is used to indicate the duration. The access network device 302 receives the second survival time information from the session management network element 301, and schedules a data packet based on the second survival time information. A specific implementation of the solution is to be described in detail in subsequent method embodiments, and therefore details are not described herein. Based on this solution, the access network device may receive the second survival time information from the session management network element, and the second survival time information indicates the duration of the service that survives when the correct data packet is not received. Therefore, the access network device can schedule the data packet based on the second survival time information. In an application layer data packet transmission process, this can avoid problems that an application layer is interrupted and a normal application layer service is affected because a network layer does not transmit an application layer data packet based on a QoS requirement of an application layer service, and can ensure service continuity.

For example, the access network device may configure a survival time timer for the service on the access network device side based on the second survival time information. Timing duration of the survival time timer is equal to the duration of the service that survives when the correct data packet is not received and that is indicated by the second survival time information. In addition, a trigger condition of the survival time timer and behavior of the access network device and/or a terminal device after the survival time timer is triggered may be specified. For example, whether the survival time timer is started may be determined based on a transmission result of a previous data packet or previous n continuous data packets. To be specific, the trigger condition of the survival time timer is that one or n continuous data packets fail to be transmitted within a specified delay range.

When the survival time timer is triggered, the behavior of the access network device and/or the terminal device includes but is not limited to: once it is determined that a timer for a service is started, performing transmission enhancement on a next application layer data packet of the service, including but not limited to increasing a quantity of retransmission times, adjusting a modulation and coding scheme (MCS), increasing a transmit power, increasing a quantity of retransmission times, increasing a quantity of transmission resources, and the like, and increasing a priority of the service, including but not limited to a scheduling priority, a media access control (MAC) layer packet assembly priority, a logical channel priority, and the like. A purpose is to ensure that subsequent data packets of the service are successfully transmitted, to avoid a problem that the survival time timer at the application layer expires because the continuous data packets fail to be transmitted, and finally to avoid a problem that the application layer is interrupted due to a transmission failure on a network side. If an expected application layer data packet arrives in a running process of the survival time timer, the survival time timer stops and the application layer is not affected. If the survival time timer runs until the survival time timer expires (it means that no expected application layer data packet arrives within a period of time during which the survival time timer is active), the application layer is interrupted. In this case, the application layer enters a predefined state after being interrupted, affecting a normal application layer service. Survival time specified by an application layer data packet usually refers to a time range limited for a delay and a jitter.

Figure 4:
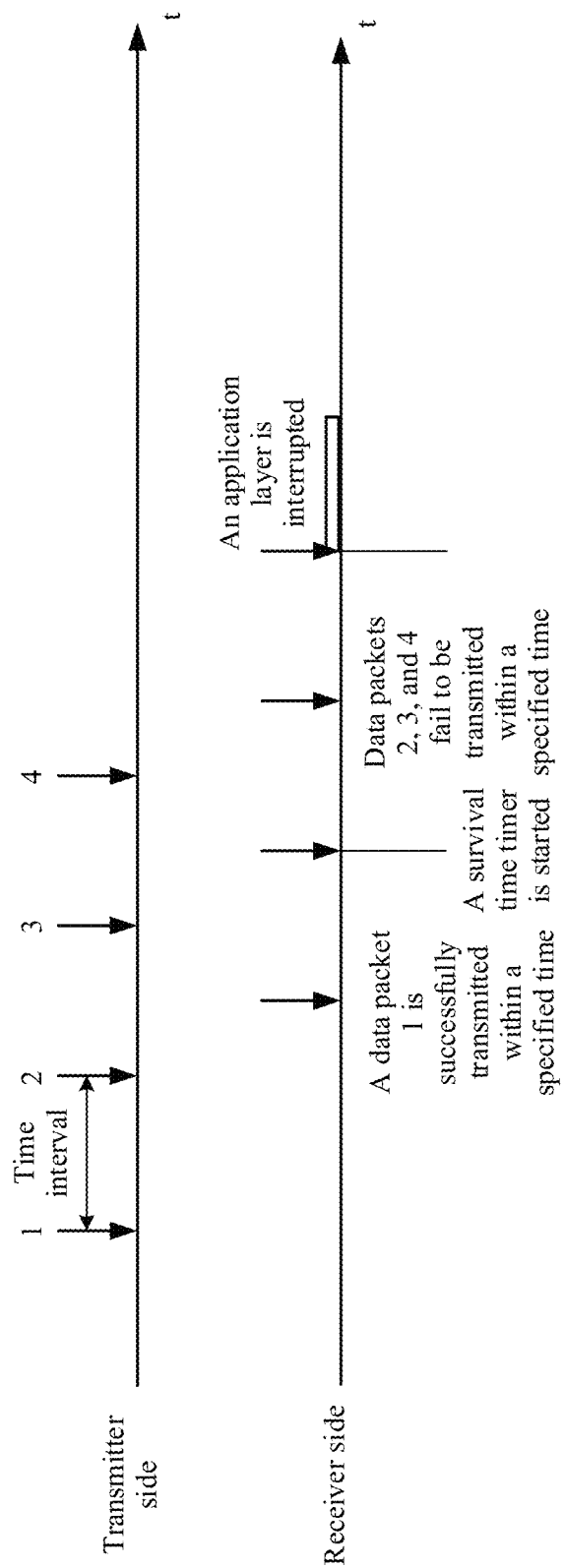
FIG. 4 is a schematic diagram of survival time according to an embodiment of this application.

To be specific, when the survival time timer is configured at the application layer, the network layer can actually "make up" for unreliable communication. Even if an application layer data packet fails to be transmitted, the application layer is not interrupted by a communication error that occurs at the network layer, provided that a data packet can be successfully transmitted before the survival time timer expires. To be specific, even if the network layer actually does not meet a requirement that a 1-ms delay plus 99.999% reliability needs to be ensured on a user plane, where the requirement is set for an air interface indicator in research of 3GPP Rel 15, the application layer is basically not interrupted provided that the communication error does not centrally occur in a continuous period of time (that the communication error centrally occurs in a period of time means that no application layer data packet is correctly transmitted in an active process of the survival time timer). In particular, in a periodic service, because a time interval (cycle time) at which a data packet is generated on a transmitter side is known, the survival time is usually equal to n cycle times, and may be actually understood as a quantity of continuously sent data packets. For example, when the survival time is two cycle times, the survival time timer needs to go through, from start to timeout, a process of sending two continuous data packets. The application layer is interrupted when communication errors occur on at least three continuous data packets. (Start of the survival timer is triggered by a communication error that occurs on one data packet. After being triggered, the timer goes through two cycle times, namely, a process of sending two data packets. The application layer is interrupted only after the two data packets fail to be sent. That is, the application layer is interrupted only after communication errors occur on the three continuous data packets.) As shown in FIG. 4, if an application layer data packet 1 is successfully transmitted within a specified time range, the application layer is not interrupted. If an application layer data packet 2 fails to be transmitted within a specified time range, an application layer on a receiver side starts a survival time timer (a length of the timer is two cycle times). If both an application layer data packet 3 and an application layer data packet 4 fail to be transmitted, and the timer expires, the application layer is interrupted. The application layer is interrupted only after the three continuous data packets (for example, the data packet 2, the data packet 3, and the data packet 4) fail to be transmitted. Otherwise, the application layer is not interrupted. Therefore, service continuity can be ensured.

Figure 5A:
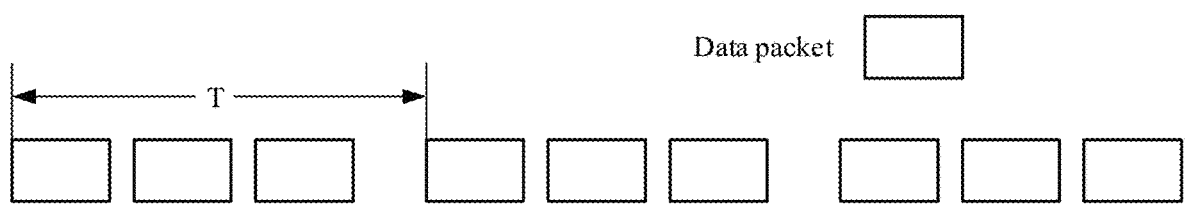
FIG. 5a is a schematic diagram 1 of scheduling a data packet according to an embodiment of this application.

It should be noted that, for a service in which a plurality of data packets need to be sent in each scheduling period, for example, as shown in FIG. 5a, three data packets are to be sent in one scheduling period. If the access network device starts the survival time timer when an error occurs on the second data packet in a scheduling period, and the access network device quickly receives the third data packet in the scheduling period, the access network device can stop the survival time timer. However, the third data packet in the scheduling period is not a "guaranteed packet" for the second data packet (that is, the survival time timer may be ended after the data packet is received), and a guaranteed packet is available only for the second data packet in each of next x scheduling periods. To avoid an error, the following two corresponding processing manners may be used.

Figure 5B:
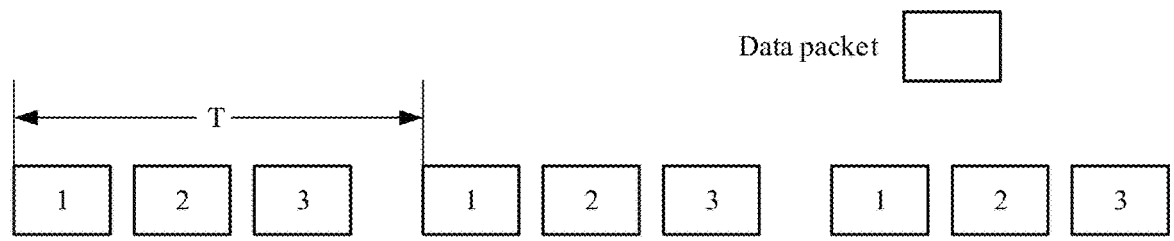
FIG. 5b is a schematic diagram 2 of scheduling a data packet according to an embodiment of this application.

Manner 1: For example, as shown in FIG. 5b, a UPF network element or a terminal device may mark data packets in each scheduling period with order identifiers, to facilitate identification by the access network device. In this way, the access network device considers data packets with a same order identifier as "guaranteed packets". For example, assuming that the access network device starts a survival time timer when an error occurs on the second data packet in the first scheduling period in FIG. 5b, correctly receiving the second data packet in the second scheduling period is considered as receiving a correct "guaranteed packet". The application layer is interrupted only when the correct "guaranteed packet" is not received within the survival time. Otherwise, the application layer is not interrupted. Therefore, service continuity can be ensured.

Certainly, a network side may send a quantity of data packets in the scheduling period to the access network device. The access network device counts data packets by using a built-in counter, to determine an order identifier of a corresponding data packet in a current scheduling period based on a quantity of data packets in the scheduling period and a count value, and further determine, in the foregoing manner, whether the correct "guaranteed packet" is received within the survival time. The application layer is interrupted only when the correct "guaranteed packet" is not received within the survival time. Otherwise, the application layer is not interrupted. Therefore, service continuity can be ensured.

Figure 5C:
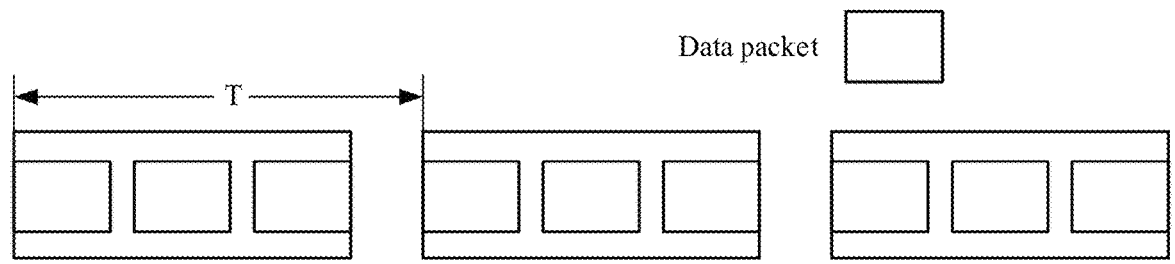
FIG. 5c is a schematic diagram 3 of scheduling a data packet according to an embodiment of this application.

Manner 2: For example, as shown in FIG. 5c, when processing based on a survival time timer is performed, data packets in one scheduling period are considered as one data packet. To be specific, when an error packet occurs on each group of data packets, survival time is counted starting from the last data packet. Correctly receiving a next group of all data packets is considered as receiving a correct "guaranteed packet". The application layer is interrupted only when the correct "guaranteed packet" is not received within the survival time. Otherwise, the application layer is not interrupted. Therefore, service continuity can be ensured.

Optionally, the communications system 30 shown in FIG. 3 may be applied to a 5th generation (5G) network currently discussed, another future network, or the like. This is not specifically limited in this embodiment of this application.

Figure 6A:
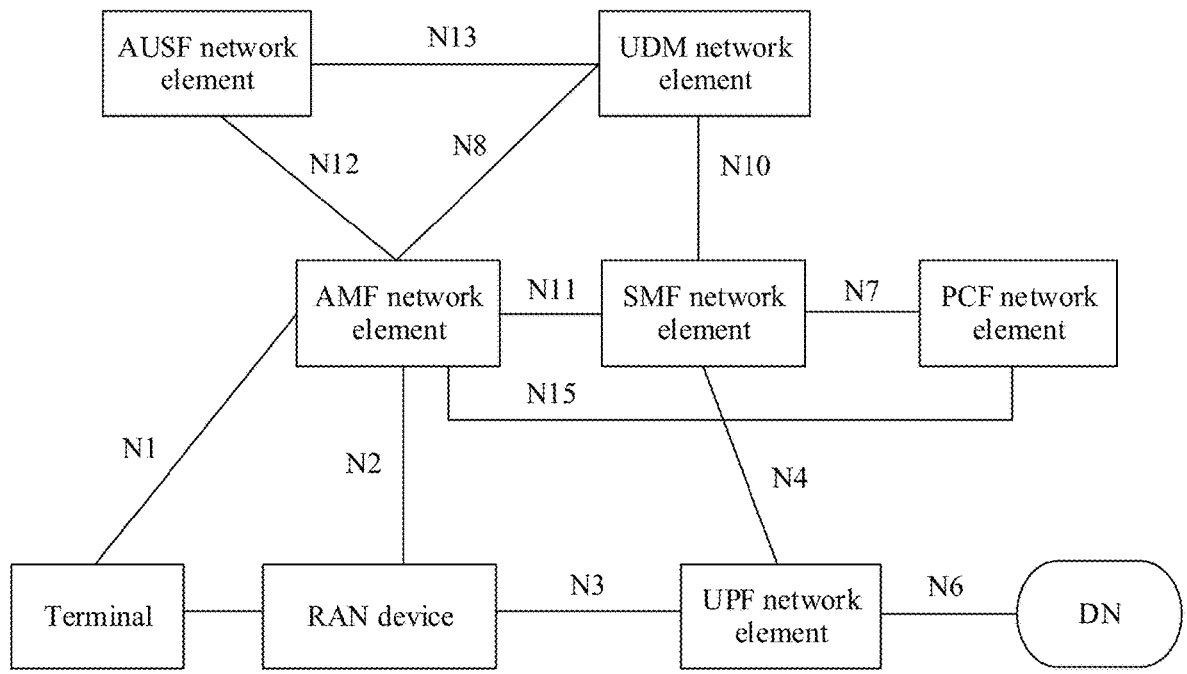
FIG. 6a shows a 5G network architecture 1 in a non-roaming scenario according to an embodiment of this application.

For example, assuming that the communications system 30 shown in FIG. 3 is applied to a 5G network architecture in a non-roaming scenario, as shown in FIG. 6a, a network element or an entity corresponding to the access network device 302 may be a radio access network (RAN) device in the non-roaming 5G network architecture, and a network element or an entity corresponding to the session management network element 301 may be an SMF network element in the non-roaming 5G network architecture.

In addition, as shown in FIG. 6a, the non-roaming 5G network architecture may further include a UPF network element, an AMF network element, a unified data management (UDM) network element, a PCF network element, an authentication server function (authentication server function, AUSF) network element, or the like. This is not specifically limited in this embodiment of this application.

A terminal communicates with the AMF network element through a next generation (Next generation, N) 1 interface (N1 for short). The RAN device communicates with the AMF network element through an N2 interface (N2 for short), and the RAN device communicates with the UPF network element through an N3 interface (N3 for short). The UPF network element communicates with a DN through an N6 interface (N6 for short). The AMF network element communicates with the SMF network element through an N11 interface (N11 for short), the AMF network element communicates with the UDM network element through an N8 interface (N8 for short), the AMF network element communicates with the AUSF network element through an N12 interface (N12 for short), and the AMF network element communicates with the PCF network element through an N15 interface (N15 for short). The SMF network element communicates with the PCF network element through an N7 interface (N7 for short), the SMF network element communicates with the UPF network element through an N4 interface (N4 for short), and the SMF network element communicates with the UDM network element through an N10 interface (N10 for short). The UDM network element communicates with the AUSF network element through an N13 interface (N13 for short).

Figure 6B:
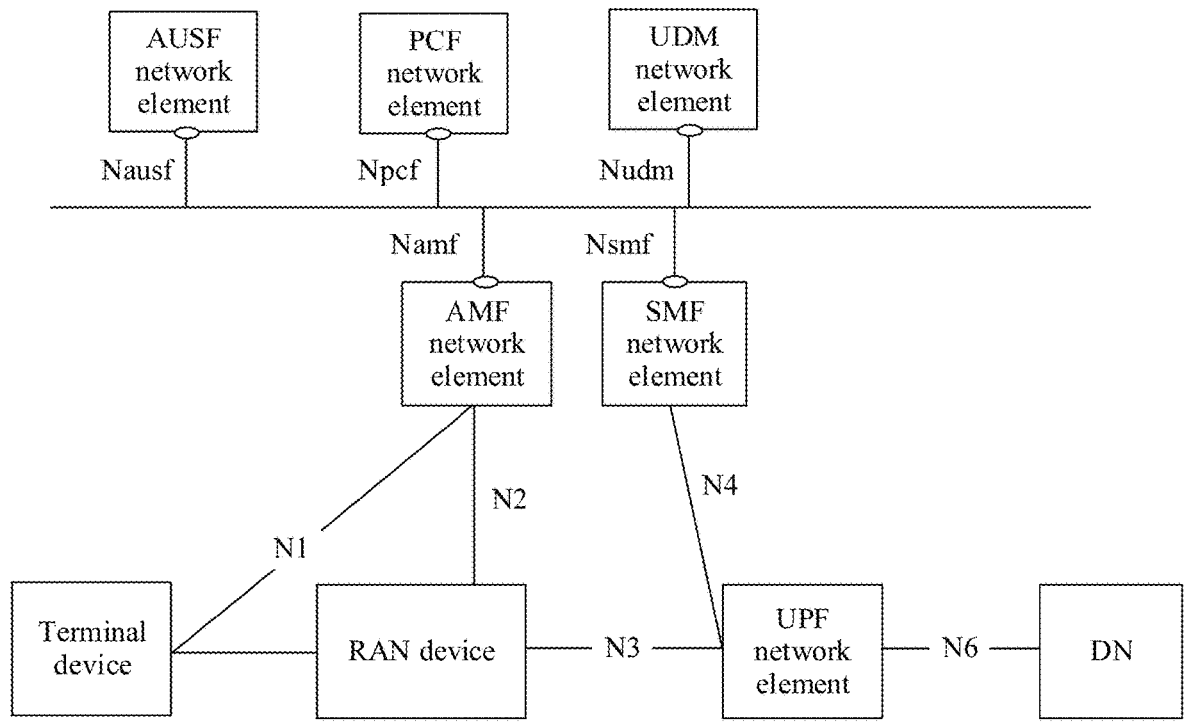
FIG. 6b shows a 5G network architecture 2 in a non-roaming scenario according to an embodiment of this application.

In addition, it should be noted that control plane network elements such as the AMF network element, the SMF network element, the UDM network element, the AUSF network element, and the PCF network element in the non-roaming 5G network architecture shown in FIG. 6a may alternatively interact with each other through a service-based interface. For example, as shown in FIG. 6b, a service-based interface exhibited by the AMF network element may be Namf; a service-based interface exhibited by the SMF network element may be Nsmf; a service-based interface exhibited by the UDM network element may be Nudm; a service-based interface exhibited by the PCF network element may be Npcf; and a service-based interface exhibited by the AUSF network element may be Nausf. For related descriptions, refer to a 5G system architecture (5G system architecture) in the standard TS 23.501. Details are not described herein.

Figure 7A:
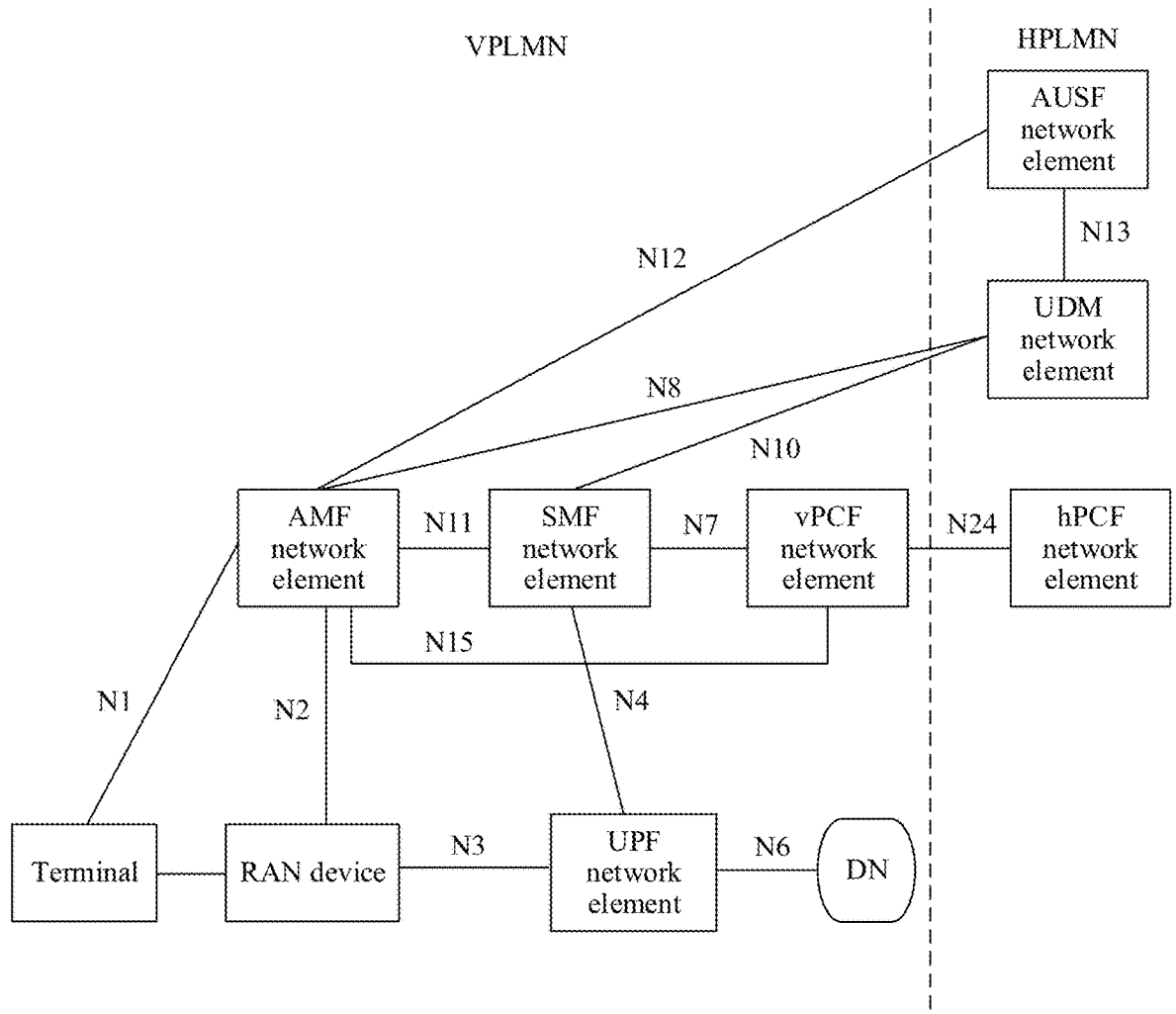
FIG. 7a shows a 5G network architecture 1 in a local breakout roaming scenario according to an embodiment of this application.

Alternatively, for example, assuming that the communications system 30 shown in FIG. 3 is applied to a 5G network architecture in a local breakout (local breakout) roaming scenario, as shown in FIG. 7a, a network element or an entity corresponding to the access network device 302 may be a RAN device in the local breakout roaming 5G network architecture, and a network element or an entity corresponding to the session management network element 301 may be an SMF network element in the local breakout roaming 5G network architecture.

In addition, as shown in FIG. 7a, the local breakout roaming 5G network architecture may further include a UPF network element, an AMF network element, a UDM network element, a visited PCF (vPCF) network element, a home PCF (hPCF) network element, an AUSF network element, or the like. This is not specifically limited in this embodiment of this application. The UDM network element, the AUSF network element, and the hPCF network element belong to a home public land mobile network (HPLMN). The RAN device, the AMF network element, the SMF network element, the UPF network element, or the vPCF network element belongs to a visited public land mobile network (VPLMN).

A terminal communicates with the AMF network element through an N1 interface (N1 for short). The RAN device communicates with the AMF network element through an N2 interface (N2 for short), and the RAN device communicates with the UPF network element through an N3 interface (N3 for short). The UPF network element communicates with a DN through an N6 interface (N6 for short). The AMF network element communicates with the SMF network element through an N11 interface (N11 for short), the AMF network element communicates with the UDM network element through an N8 interface (N8 for short), the AMF network element communicates with the AUSF network element through an N12 interface (N12 for short), and the AMF network element communicates with the vPCF network element through an N15 interface (N15 for short). The SMF network element communicates with the vPCF network element through an N7 interface (N7 for short). The vPCF network element communicates with the hPCF network element through an N24 interface (N24 for short). The SMF network element communicates with the UPF network element through an N4 interface (N4 for short), and the SMF network element communicates with the UDM network element through an N10 interface (N10 for short). The UDM network element communicates with the AUSF network element through an N13 interface (N13 for short).

Figure 7B:
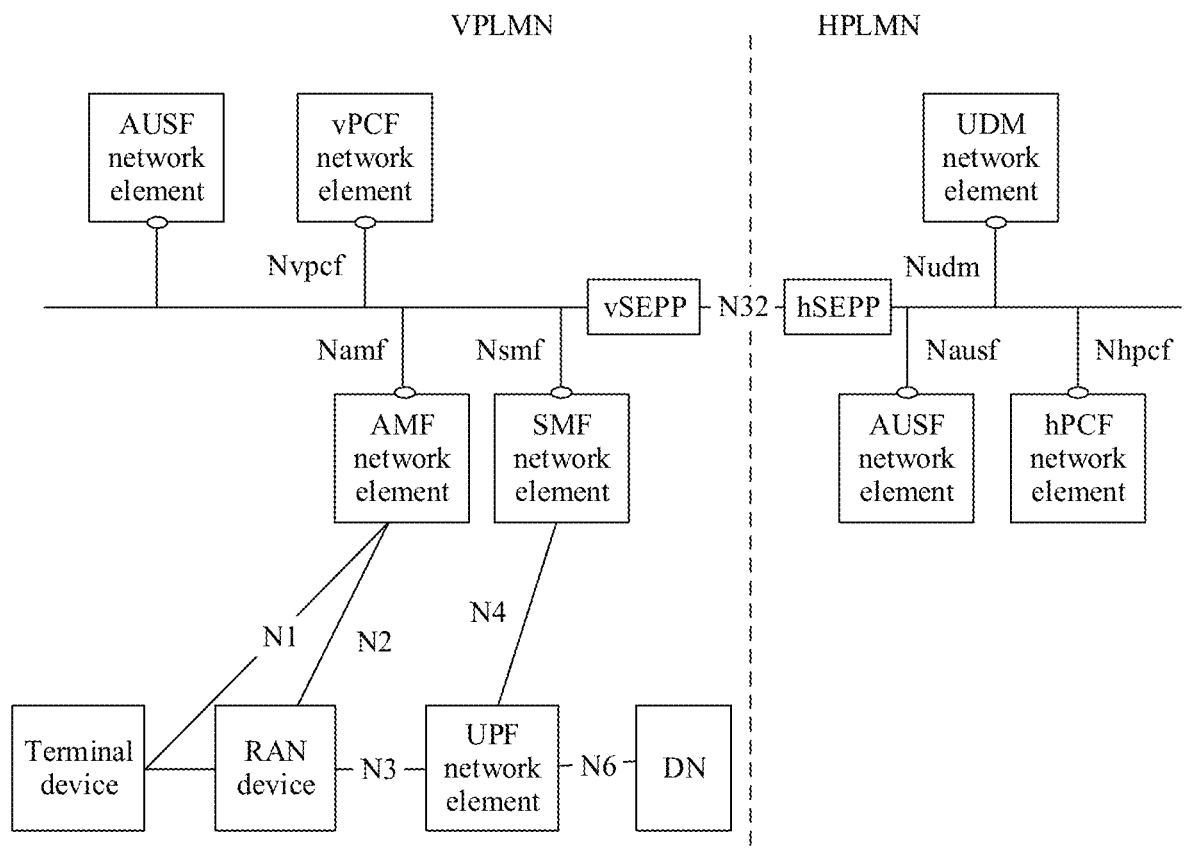
FIG. 7b shows a 5G network architecture 2 in a local breakout roaming scenario according to an embodiment of this application.

In addition, it should be noted that control plane network elements such as the AMF network element, the SMF network element, the UDM network element, the AUSF network element, the vPCF network element, and the hPCF network element in the local breakout roaming 5G network architecture shown in FIG. 7a may also interact with each other through a service-based interface. For example, as shown in FIG. 7b, a service-based interface exhibited by the AMF network element may be Namf; a service-based interface exhibited by the SMF network element may be Nsmf; a service-based interface exhibited by the UDM network element may be Nudm; a service-based interface exhibited by the vPCF network element may be Nvpcf; a service-based interface exhibited by the hPCF network element may be Nhpcf; and a service-based interface exhibited by the AUSF network element may be Nausf. In addition, a visited security edge protection proxy (vSEPP) in FIG. 7b is configured to perform information filtering, policy control, topology hiding, and the like on a control plane interface in the VPLMN. A home security edge protection proxy (hSEPP) in FIG. 7b is configured to perform information filtering, policy control, topology hiding, and the like on a control plane interface in the HPLMN. The vSEPP is connected to the hSEPP through an N32 interface (N32 for short). For all related descriptions, refer to a 5G system architecture (5G system architecture) in the standard TS 23.501. Details are not described herein.

Figure 8A:
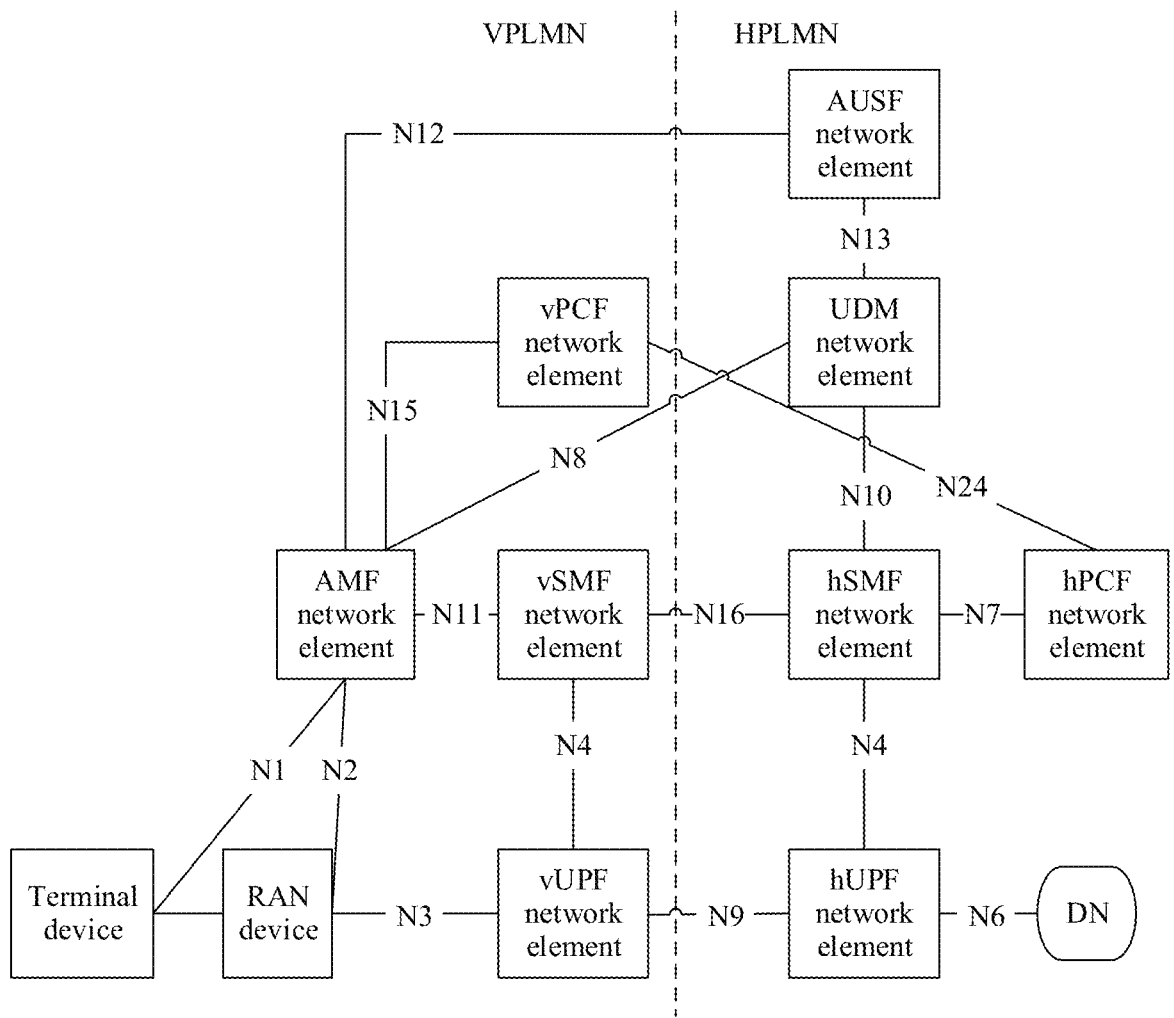
FIG. 8a shows a 5G network architecture 1 in a home routed roaming scenario according to an embodiment of this application.

Alternatively, for example, assuming that the communications system 30 shown in FIG. 3 is applied to a 5G network architecture in a home routed (home routed) roaming scenario, as shown in FIG. 8a, a network element or an entity corresponding to the access network device 302 may be a RAN device in the home routed roaming 5G network architecture, and a network element or an entity corresponding to the session management network element 301 may be a visited SMF (vSMF) network element in the home routed roaming 5G network architecture.

In addition, as shown in FIG. 8a, the home routed roaming 5G network architecture may further include a home UPF (hUPF) network element, a visited UPF (vUPF) network element, a home SMF (hSMF) network element, an AMF network element, a UDM network element, a vPCF network element, an hPCF network element, an AUSF network element, or the like. This is not specifically limited in this embodiment of this application. The UDM network element, the AUSF network element, the hSMF network element, the hPCF network element, or the hUPF network element belongs to an HPLMN. The RAN device, the AMF network element, the vSMF network element, the vUPF network element, or the vPCF network element belongs to a VPLMN.

A terminal communicates with the AMF network element through an N1 interface (N1 for short). The RAN device communicates with the AMF network element through an N2 interface (N2 for short), and the RAN device communicates with the UPF network element through an N3 interface (N3 for short). The UPF network element communicates with a DN through an N6 interface (N6 for short). The AMF network element communicates with the vSMF network element through an N11 interface (N11 for short). The vSMF network element communicates with the hSMF network element through an N16 interface (N16 for short). The AMF network element communicates with the UDM network element through an N8 interface (N8 for short), the AMF network element communicates with the AUSF network element through an N12 interface (N12 for short), and the AMF network element communicates with the vPCF network element through an N15 interface (N15 for short). The vPCF network element communicates with the hPCF network element through an N24 interface (N24 for short). The vSMF network element communicates with the vUPF network element through an N4 interface (N4 for short). The hSMF network element communicates with the hUPF network element through an N4 interface (N4 for short), the hSMF network element communicates with the vUPF network element through an N9 interface (N9 for short), the hSMF network element communicates with the UDM network element through an N10 interface (N10 for short), and the hSMF network element communicates with the UDM network element through an N7 interface (N7 for short). The UDM network element communicates with the AUSF network element through an N13 interface (N13 for short).

Figure 8B:
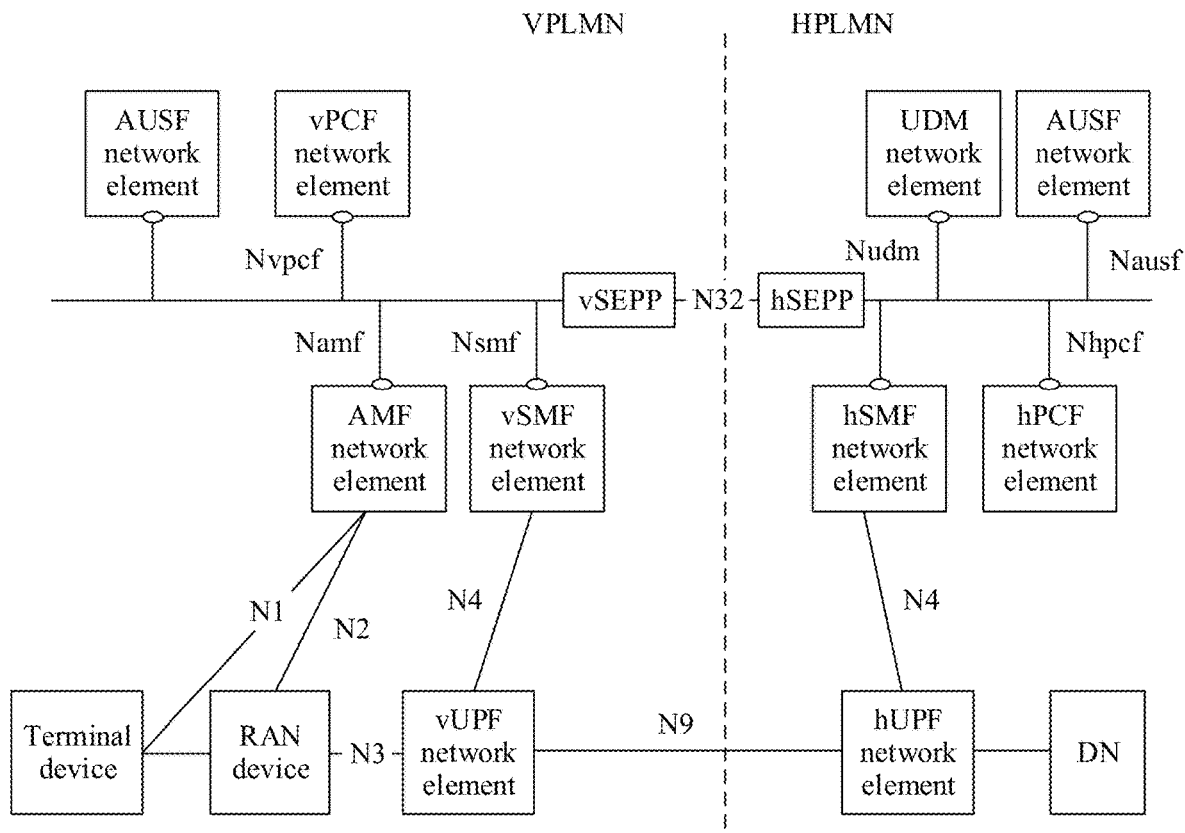
FIG. 8b shows a 5G network architecture 2 in a home routed roaming scenario according to an embodiment of this application.

In addition, it should be noted that control plane network elements such as the AMF network element, the vSMF network element, the hSMF network element, the UDM network element, the AUSF network element, the vPCF network element, and the hPCF network element in the home routed roaming 5G network architecture shown in FIG. 8*a* may also interact with each other through a service-based interface. For example, as shown in FIG. 8*b*, a service-based interface exhibited by the AMF network element may be Namf; a service-based interface exhibited by the vSMF network element may be Nvsmf; a service-based interface exhibited by the hSMF network element may be Nhsmf; a service-based interface exhibited by the UDM network element may be Nudm; a service-based interface exhibited by the vPCF network element may be Nvpcf; a service-based interface exhibited by the hPCF network element may be Nhpcf; and a service-based interface exhibited by the AUSF network element may be Nausf. In addition, a vSEPP in FIG. 8*b* is configured to perform information filtering, policy control, topology hiding, and the like on a control plane interface in the VPLMN. An hSEPP in FIG. 8*b* is configured to perform information filtering, policy control, topology hiding, and the like on a control plane interface in the HPLMN. The vSEPP is connected to the hSEPP through an N32 interface (N32 for short). For all related descriptions, refer to a 5G system architecture (5G system architecture) in the standard TS 23.501. Details are not described herein.

Optionally, the terminal device in this embodiment of this application may be a device such as a terminal or a chip that may be used in a terminal, configured to implement a wireless communication function. The terminal may be user equipment (UE), an access terminal, a terminal unit, a terminal station, a mobile station, a mobile console, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. The terminal may be mobile or in a fixed position.

Optionally, the access device in this embodiment of this application is a device that accesses a core network, for example, may be a base station, a broadband network gateway (BNG), an aggregation switch, or a non-3rd generation partnership project (3GPP) access device. There may be base stations in various forms, for example, a macro base station, a micro base station (also referred to as a small cell), a relay station, and an access point.

Optionally, the session management network element or the terminal device in this embodiment of this application may also be referred to as a communications apparatus, and may be a general-purpose device or a dedicated device. This is not specifically limited in this embodiment of this application.

Optionally, a related function of the session management network element or the terminal device in this embodiment of this application may be implemented by one device, may be jointly implemented by a plurality of devices, or may be implemented by one or more functional modules in one device. This is not specifically limited in this embodiment of this application. It may be understood that the foregoing function may be a function of a network element on a hardware device, may be a function of software running on dedicated hardware, may be a function of a combination of hardware and software, or may be a virtualization function instantiated on a platform (for example, a cloud platform).

Figure 9:
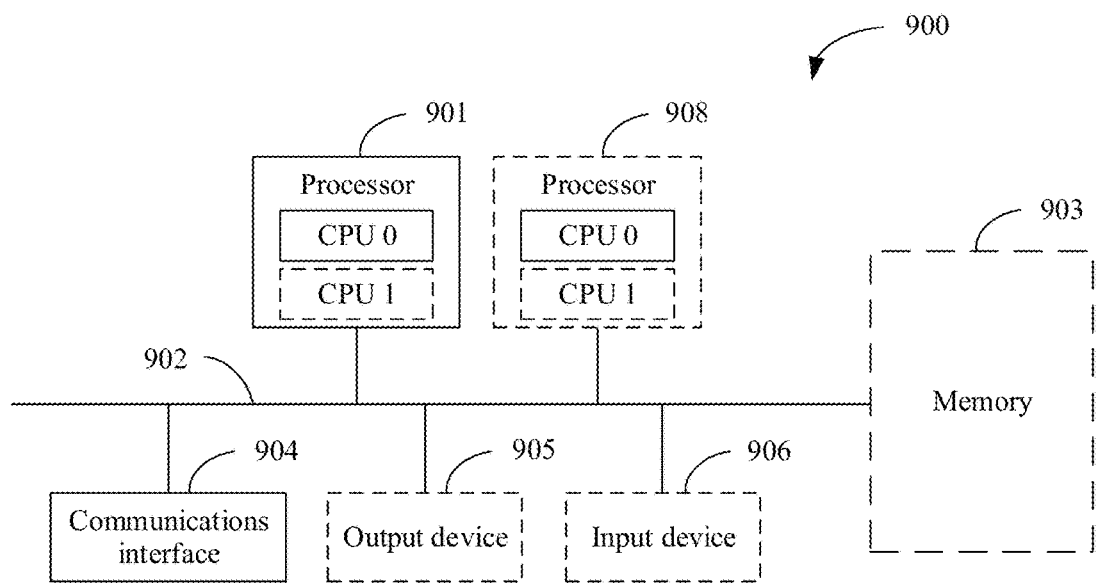
FIG. 9 is a schematic structural diagram of a communications device according to an embodiment of this application.

For example, the related function of the session management network element or the terminal device in this embodiment of this application may be implemented by a communications device 900 in FIG. 9. FIG. 9 is a schematic structural diagram of a communications device 900 according to an embodiment of this application. The communications device 900 includes one or more processors 901, a communications line 902, and at least one communications interface (an example in which the communications device 900 includes a communications interface 904 and one processor 901 is merely used in FIG. 9 for description). Optionally, the communications device 900 may further include a memory 903.

The processor 901 may be a general-purpose central processing unit (CPU), a microprocessor, an application-specific integrated circuit (ASIC), or one or more integrated circuits for controlling program execution of the solutions of this application.

The communications line 902 may include a path used to connect different components.

The communications interface 904 may be a transceiver module configured to communicate with another device or a communications network such as the Ethernet, a RAN, or a wireless local area network (WLAN). For example, the transceiver module may be an apparatus such as a transceiver or a transceiver. Optionally, the communications interface 904 may alternatively be a transceiver circuit located in the processor 901, and is configured to implement signal input and signal output of the processor.

The memory 903 may be an apparatus having a storage function. For example, the memory 903 may be a read-only memory (ROM) or another type of static storage device that can store static information and an instruction, or a random access memory (RAM) or another type of dynamic storage device that can store information and an instruction. The memory 903 may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory 903 is not limited thereto. The memory may exist independently, and is connected to the processor through the communications line 902. Alternatively, the memory may be integrated into the processor.

The memory 903 is configured to store computer execution instructions for executing the solutions in this application, and the processor 901 controls execution of the computer execution instructions. The processor 901 is configured to execute the computer execution instructions stored in the memory 903, to implement a service continuity implementation method provided in the embodiments of this application.

Alternatively, optionally, in this embodiment of this application, the processor 901 may perform processing-related functions in a service continuity implementation method provided in the following embodiments of this application, and the communications interface 904 is responsible for communicating with another device or a communications network. This is not specifically limited in this embodiment of this application.

Optionally, the computer execution instructions in this embodiment of this application may also be referred to as application program code. This is not specifically limited in this embodiment of this application.

In a specific implementation, in an embodiment, the processor 901 may include one or more CPUs, for example, a CPU 0 and a CPU 1 in FIG. 9.

In a specific implementation, in an embodiment, the communications device 900 may include a plurality of processors, for example, the processor 901 and a processor 908 in FIG. 9. Each of the processors may be a single-core processor (single-CPU) or a multi-core processor (multi-CPU). The processor herein may be one or more devices, circuits, and/or processing cores configured to process data (for example, computer program instructions).

In a specific implementation, in an embodiment, the communications device 900 may further include an output device 905 and an input device 906. The output device 905 communicates with the processor 901, and may display information in a plurality of manners. For example, the output device 905 may be a liquid crystal display (LCD), a light emitting diode (LED) display device, a cathode ray tube (CRT) display device, a projector (projector), or the like. The input device 906 communicates with the processor 901, and may receive an input of a user in a plurality of manners. For example, the input device 906 may be a mouse, a keyboard, a touchscreen device, a sensing device, or the like.

The communications device 900 may also be referred to as a communications apparatus sometimes, and may be a general-purpose device or a dedicated device. For example, the communications device 900 may be a desktop computer, a portable computer, a network server, a personal digital assistant (PDA), a mobile phone, a tablet computer, a wireless terminal device, an embedded device, the foregoing terminal device, the foregoing network device, or a device having a structure similar to the structure shown in FIG. 9. A type of the communications device 900 is not limited in this embodiment of this application.

The following describes in detail a service continuity implementation method provided in the embodiments of this application with reference to FIG. 3 to FIG. 9.

It should be noted that in the following embodiments of this application, names of messages between network elements, names of parameters in messages, or the like are merely examples, and may be other names in a specific implementation. This is not specifically limited in the embodiments of this application.

Figure 10A:
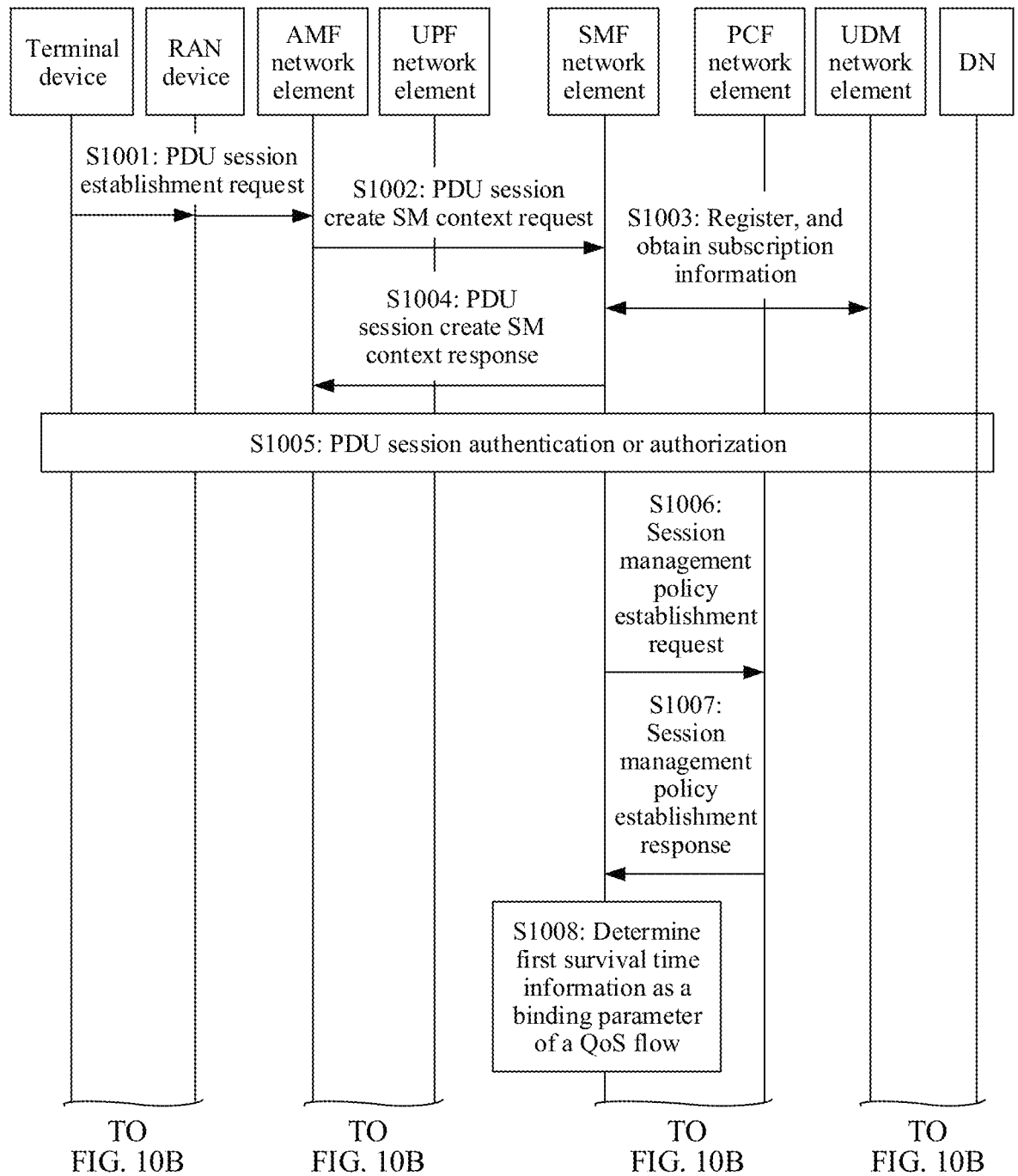
FIGS. 10A and 10B are a schematic flowchart 1 of a service continuity implementation method according to an embodiment of this application.
Figure 10B:
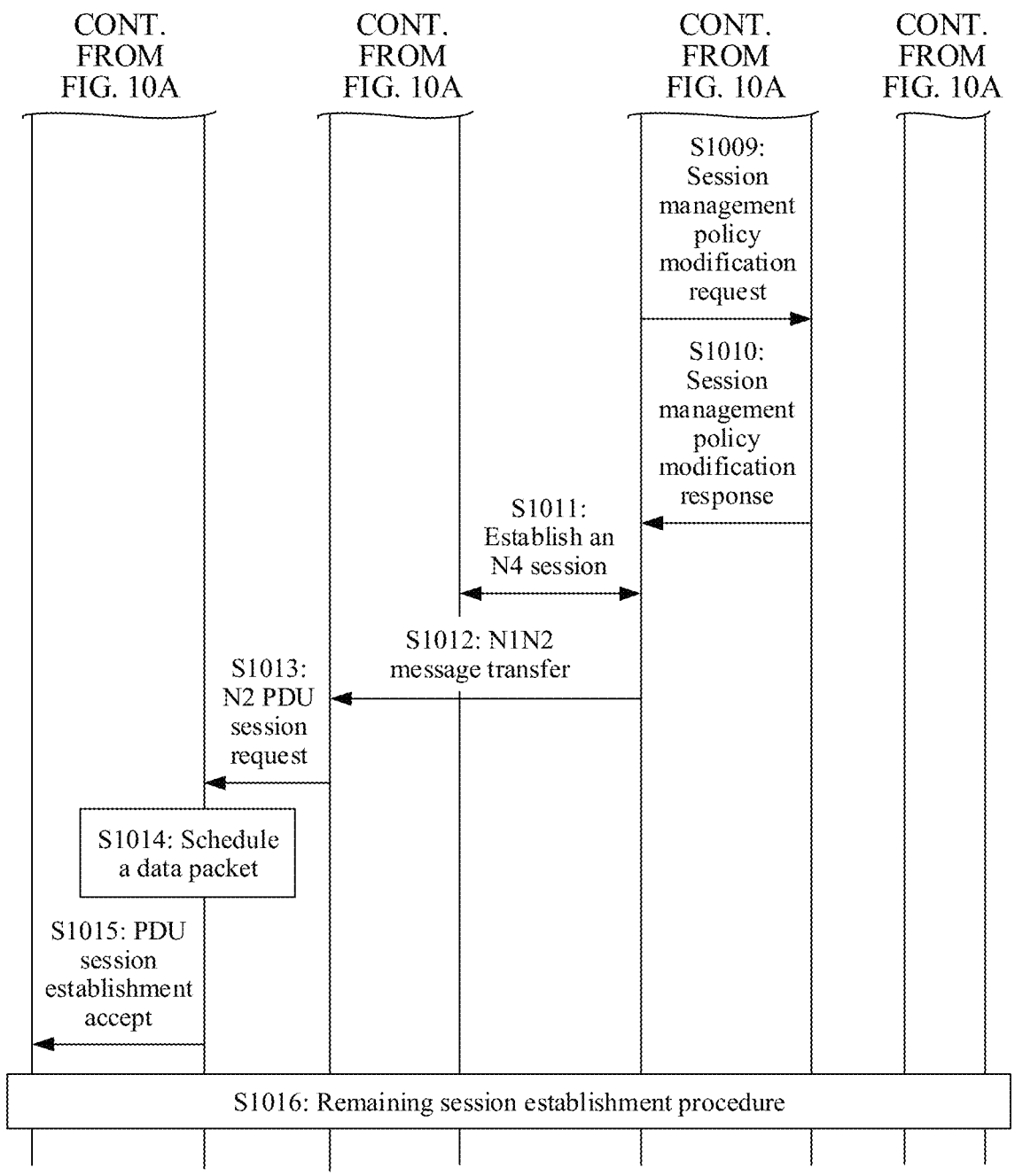

First, for example, the communications system shown in FIG. 3 is applied to the 5G network architecture in the non-roaming scenario shown in FIG. 6a or FIG. 6b, and the SMF network element sends survival time information to the RAN device on a control plane. FIGS. 10A and 10B show a service continuity implementation method according to an embodiment of this application. The service continuity implementation method includes the following steps.

S1001: A terminal device sends a message 1 to an AMF network element. The AMF network element receives the message 1 from the terminal device.

For example, the message 1 may be a PDU session establishment request (PDU session establishment request) in FIGS. 10A and 10B.

S1002: After selecting an SMF network element, the AMF network element sends a message 2 to the selected SMF network element. The SMF network element receives the message 2 from the AMF network element.

For example, the message 2 may be a PDU session create session management (SM) context request (PDU session create SM context request) in FIGS. 10A and 10B.

S1003: The SMF network element registers with a UDM network element, and obtains subscription information from the UDM network element.

S1004: The SMF network element sends a message 3 to the AMF network element. The AMF network element receives the message 3 from the SMF network element.

For example, the message 3 may be a PDU session create SM context response (PDU session create SM context response) in FIGS. 10A and 10B.

Optionally, the SMF network element may reject establishment of a PDU session in this step, and use the message 3 to carry a cause value.

S1005: Perform PDU session authentication (authentication) or authorization (authorization).

For a specific implementation of steps S1001 to S1005, refer to an existing implementation. Details are not described herein.

S1006: The SMF network element selects a PCF network element, and sends a message 4 to the selected PCF network element. The PCF network element receives the message 4 from the SMF network element. The message 4 is used to request a PCC rule.

For example, the message 4 may be a session management policy establishment request (session management policy establishment request) in FIGS. 10A and 10B.

S1007: The PCF network element sends a message 5 to the SMF network element. The SMF network element receives the message 5 from the PCF network element.

For example, the message 5 may be a session management policy establishment response (session management policy establishment response) in FIGS. 10A and 10B.

The message 5 includes a PCC rule, and the PCC rule includes first survival time information. The first survival time information indicates duration of a service that survives when a correct data packet is not received.

Optionally, the first survival time information may be, for example, survival time 1 or an identifier of the survival time 1, and the identifier of the survival time 1 may be used to determine the survival time 1. A specific form is not specifically limited in this embodiment of this application.

S1008: The SMF network element determines the first survival time information as a binding parameter of a QoS flow.

To be specific, the SMF network element considers the first survival time information when performing QoS flow binding (QoS flow binding). QoS flow binding is the association of a PCC rule to a QoS flow within a PDU session. In this embodiment of this application, the binding is performed using the following binding parameters.

1. 5QI: For related descriptions, refer to the brief description part in the description of the embodiments. Details are not described herein again.
2. ARP: For related descriptions, refer to the brief description part in the background. Details are not described herein again.
3. First survival time information Optionally, if the PCC rule includes one or more of the following parameters, the one or more of the following parameters may also be used as the binding parameter:

4. QoS notification control: For related descriptions, refer to the brief description part in the background. Details are not described herein again.
5. Priority level: For related descriptions, refer to the brief description part in the background. Details are not described herein again.
6. Averaging window: For related descriptions, refer to the brief description part in the background. Details are not described herein again.
7. Maximum data burst volume: For related descriptions, refer to the brief description part in the background. Details are not described herein again.

After the SMF network element determines the first survival time information as the binding parameter of the QoS flow, all services in a same QoS flow have same survival time.

It should be noted that, in this embodiment of this application, the RAN device performs QoS control at a granularity of a QoS flow, and one QoS flow may include a plurality of services. Theoretically, survival time of different services needs to be separately calculated. However, when the RAN device performs scheduling, if an error occurs in a data packet in a QoS flow, it means that an error is very likely to occur in another data packet under a same condition (due to limited air interface resources at that time and the like). If the data packet is successfully transmitted after adjustment, it means that a remaining data packet is very likely to be successfully transmitted under a same condition. Therefore, only the survival time needs to be calculated at a coarse granularity of the QoS flow. Certainly, different applications may also be bound to different QoS flows by using the first survival time information. For example, the first survival time information is the survival time 1. Survival time of the different applications may be set to different values. If the first survival time information, that is, the survival time 1, is equal to 2 ms, survival time of an application A may be set to 2.1 ms, and survival time of an application B may be set to 2.2 ms. Alternatively, a separate application identifier may be determined as the binding parameter of the QoS flow. This is not specifically limited in this embodiment of this application. It should be noted that the foregoing descriptions are not only applicable to this embodiment of this application, but also applicable to all other embodiments of this application. Unified descriptions are provided herein, and details are not described below again.

S1009: The SMF network element sends a message 6 to the PCF network element. The PCF network element receives the message 6 from the SMF network element. The message 6 includes session-related information. The session-related information may include, for example, an internet protocol (IP) address or an IP prefix of the terminal device. For a specific implementation, refer to an existing implementation. Details are not described herein.

For example, the message 6 may be a session management policy modification request (session management policy modification request) in FIGS. 10A and 10B.

S1010: The PCF network element sends a message 7 to the SMF network element. The SMF network element receives the message 7 from the PCF network element.

For example, the message 7 may be a session management policy modification response (session management policy modification response) in FIGS. 10A and 10B.

S1011: The SMF network element selects a UPF network element, and interacts with the UPF network element to establish an N4 session. For a specific implementation, refer to an existing implementation. Details are not described herein.

S1012: The SMF network element sends a message 8 to the AMF network element. The AMF network element receives the message 8 from the SMF network element.

For example, the message 8 may be N1N2 message transfer (N1N2 message transfer) in FIGS. 10A and 10B.

The message 8 includes N2 SM information (N2 SM Information) and an N1 SM container (N1 SM container). The N2 SM information is sent to the RAN device, and the AMF network element only forwards (or transparently transmits) the N2 SM information to the RAN device. The N1 SM container is sent to the terminal device, and both the AMF network element and the RAN device only forward (or transparently transmit) the N1 SM container to the terminal device.

The N2 SM information includes a QoS profile (QoS profile), and the QoS profile includes second survival time. The second survival time information indicates the duration indicated by the first survival time information.

Optionally, the second survival time information may be, for example, the survival time 1 or the identifier of the survival time 1.

The N1 SM container includes a QoS rule (QoS rule). Optionally, the QoS rule may include third survival time information. The third survival time information indicates the duration indicated by the first survival time information.

Optionally, the third survival time information may be, for example, the survival time 1 or the identifier of the survival time 1.

Optionally, in this embodiment of this application, if the PCC rule includes the survival time 1, the SMF network element may determine the identifier of the corresponding survival time 1 based on the survival time 1 and a correspondence between the identifier of the survival time 1 and the survival time 1, and may further use the QoS rule or the QoS profile to carry the identifier of the survival time 1.

Optionally, in this embodiment of this application, if the PCC rule includes the identifier of the survival time 1, the SMF network element may determine the corresponding survival time 1 based on the identifier of the survival time 1 and a correspondence between the identifier of the survival time 1 and the survival time 1, and may further use the QoS rule or the QoS profile to carry the survival time 1.

S1013: The AMF network element sends a message 9 to the RAN device. The RAN device receives the message 9 from the AMF network element.

For example, the message 9 may be an N2 PDU session request (N2 PDU session request) in FIGS. 10A and 10B.

The message 9 includes the N2 SM information and the N1 SM container.

S1014: The RAN device schedules a data packet based on the second survival time information in the QoS profile included in the N2 SM information.

Optionally, if the second survival time information is the survival time 1, the RAN device schedules the data packet based on the survival time 1.

Optionally, if the second survival time information is the identifier of the survival time 1, the RAN device may determine the corresponding survival time 1 based on the identifier of the survival time 1 and a correspondence between the identifier of the survival time 1 and the survival time 1, and further schedules the data packet based on the survival time 1.

For a related implementation in which the RAN device schedules the data packet based on the survival time 1, refer to the related example in the communications system part. Details are not described herein again.

S1015: The RAN device sends a message 10 to the terminal device. The terminal device receives the message 10 from the RAN device.

For example, the message 10 may be PDU session establishment accept (PDU session establishment accept) in FIGS. 10A and 10B.

The message 10 includes the N1 SM container.

Optionally, if the QoS rule included in the N1 SM container includes the third survival time information, the terminal device may schedule a data packet based on the third survival time information.

Optionally, if the third survival time information is the survival time 1, the terminal device schedules the data packet based on the survival time 1.

Optionally, if the third survival time information is the identifier of the survival time 1, the terminal device may determine the corresponding survival time 1 based on the identifier of the survival time 1 and a correspondence between the identifier of the survival time 1 and the survival time 1, and further schedules the data packet based on the survival time 1.

For a related implementation in which the terminal device schedules the data packet based on the survival time 1, refer to the related example in the communications system part. Details are not described herein again.

S1016: Complete a remaining session establishment procedure.

In an application layer data packet transmission process, the service continuity implementation method provided in this embodiment of this application can avoid problems that an application layer is interrupted and a normal application layer service is affected because a network layer does not transmit an application layer data packet based on a QoS requirement of an application layer service, and can ensure service continuity. For analysis of related technical effects, refer to the foregoing communications system part. Details are not described herein again.

The actions of the terminal device or the SMF network element in steps S1001 to S1016 may be performed by the processor 901 in the communications device 900 shown in FIG. 9 by invoking the application program code stored in the memory 903. This is not limited in this embodiment.

Figure 11:
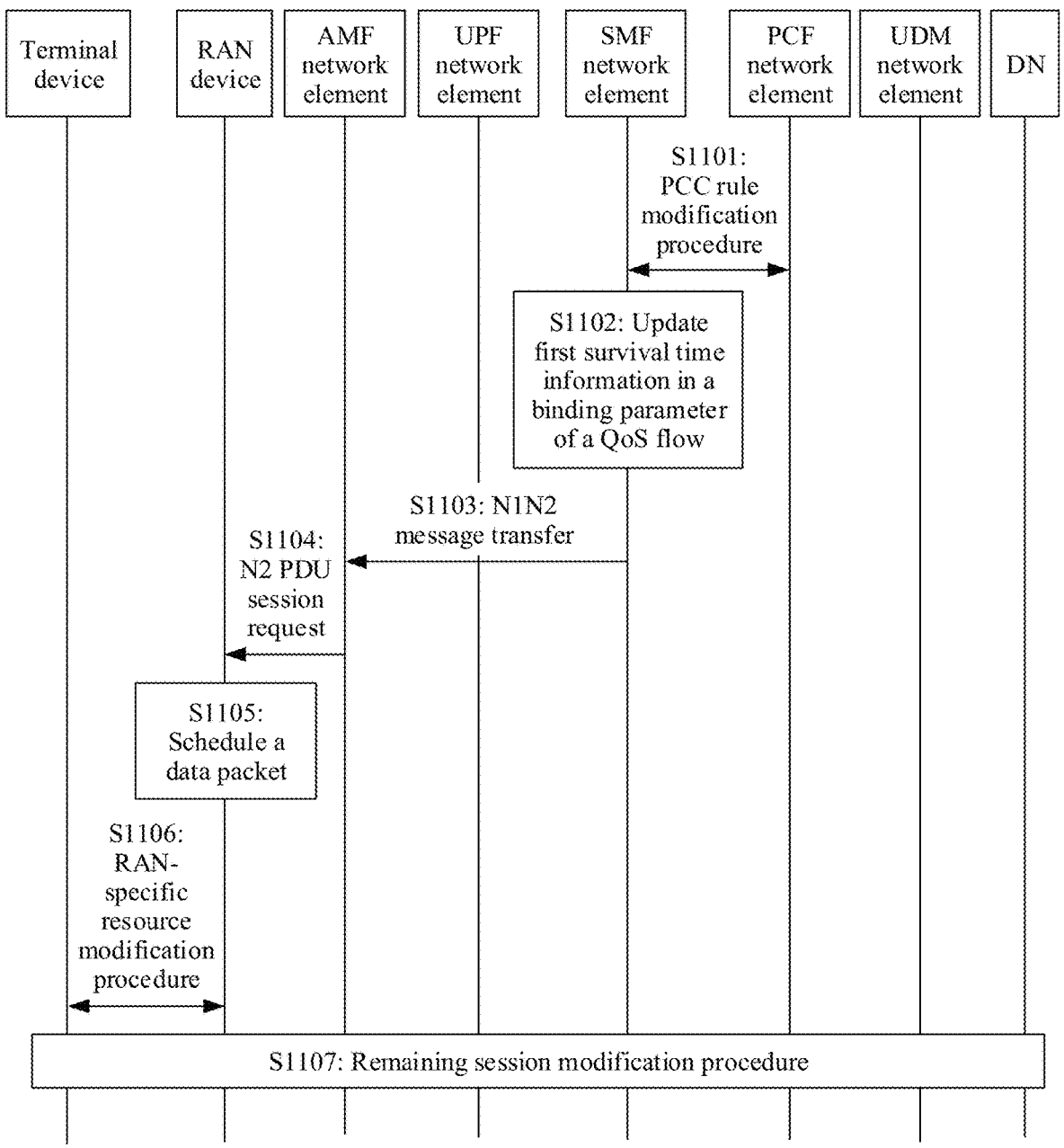
FIG. 11 is a schematic flowchart 2 of a service continuity implementation method according to an embodiment of this application.

Optionally, the PCF network element in the embodiment shown in FIG. 10A and FIG. 10B may initiate a change of survival time information. In this case, when performing QoS flow binding, the SMF network element needs to update the survival time information in the binding parameter of the QoS flow, and the RAN device also needs to update corresponding survival time information. Specifically, a service continuity implementation method in this scenario is shown in FIG. 11, and includes the following steps.

S1101: A PCF network element initiates a PCC rule modification procedure to an SMF network element.

For the PCC rule modification procedure, refer to an existing implementation. Details are not described herein.

In this embodiment of this application, a modified PCC rule includes updated survival time 1 or an identifier of the updated survival time 1.

S1102: The SMF network element updates first survival time information in a binding parameter of a QoS flow.

To be specific, the SMF network element replaces the first survival time information in the binding parameter of the QoS flow with the updated survival time 1 or the identifier of the updated survival time 1.

S1103: The SMF network element sends a message 8 to an AMF network element. The AMF network element receives the message 8 from the SMF network element.

For example, the message 8 may be N1N2 message transfer (N1N2 message transfer) in FIG. 11.

The message 8 includes N2 SM information and an N1 SM container. The N2 SM information is sent to a RAN device, and the AMF network element only forwards (or transparently transmits) the N2 SM information to the RAN device. The N1 SM container is sent to a terminal device, and both the AMF network element and the RAN device only forward (or transparently transmit) the N1 SM container to the terminal device.

Optionally, in this embodiment of this application, when the SMF network element determines to delete a GBR QoS flow, the N2 SM information includes a PDU session ID and a QFI, and the N1 SM container includes a PDU session ID, an affected QoS rule, and a corresponding QoS rule operation (that is, deletion). When the SMF network element determines to modify a QoS flow, the N2 SM information includes a PDU session ID, a QFI, and a QoS profile, and the N1 SM container includes a PDU session ID, an affected QoS rule, and a corresponding QoS rule operation (such as deletion or modification). The QoS profile herein includes the updated survival time 1 or the identifier of the updated survival time 1. Optionally, the QoS rule herein includes the updated survival time 1 or the identifier of the updated survival time 1.

Optionally, in this embodiment of this application, if the PCC rule includes the updated survival time 1, the SMF network element may determine the identifier of the corresponding updated survival time 1 based on the updated survival time 1 and a correspondence between the identifier of the updated survival time 1 and the updated survival time 1, and may further use the QoS rule or the QoS profile to carry the identifier of the updated survival time 1.

Optionally, in this embodiment of this application, if the PCC rule includes the identifier of the updated survival time 1, the SMF network element may determine the corresponding updated survival time 1 based on the identifier of the updated survival time 1 and a correspondence between the identifier of the updated survival time 1 and the updated survival time 1, and may further use the QoS rule or the QoS profile to carry the updated survival time 1.

S1104: The AMF network element sends a message 9 to the RAN device. The RAN device receives the message 9 from the AMF network element.

For example, the message 9 may be an N2 PDU session request in FIG. 11.

The message 9 includes the N2 SM information and the N1 SM container.

S1105: The RAN device schedules a data packet based on the updated survival time 1 or the identifier of the updated survival time 1 in the QoS profile included in the N2 SM information.

Optionally, if the QoS profile includes the identifier of the updated survival time 1, the RAN device may determine the corresponding updated survival time 1 based on the identifier of the updated survival time 1 and a correspondence between the identifier of the updated survival time 1 and the updated survival time 1, and further schedules the data packet based on the updated survival time 1.

For a related implementation in which the RAN device schedules the data packet based on the updated survival time 1, refer to the related example in the communications system part. Details are not described herein again.

S1106: The RAN device and the terminal device perform a RAN-specific resource modification (RAN-specific resource modification) procedure. For details, refer to an existing implementation. Details are not described herein.

In addition, in this embodiment of this application, when the RAN device and the terminal device perform the RAN-specific resource modification procedure, the RAN device may send the N1 SM container to the terminal device.

Optionally, if the QoS rule included in the N1 SM container includes the updated survival time 1 or the identifier of the updated survival time 1, the terminal device may schedule a data packet based on the updated survival time 1 or the identifier of the updated survival time 1.

Optionally, if the QoS rule included in the N1 SM container includes the identifier of the updated survival time 1, the terminal device may determine the corresponding updated survival time 1 based on the identifier of the updated survival time 1 and a correspondence between the identifier of the updated survival time 1 and the updated survival time 1, and further schedules a data packet based on the updated survival time 1. For a related implementation in which the terminal device schedules the data packet based on the updated survival time 1, refer to the related example in the communications system part. Details are not described herein again.

S1107: Complete a remaining session modification procedure.

In an application layer data packet transmission process, the service continuity implementation method provided in this embodiment of this application can avoid problems that an application layer is interrupted and a normal application layer service is affected because a network layer does not transmit an application layer data packet based on a QoS requirement of an application layer service, and can ensure service continuity. For analysis of related technical effects, refer to the foregoing communications system part. Details are not described herein again. In addition, based on the service continuity implementation method provided in this embodiment of this application, the survival time information can be further updated in a timely manner.

The actions of the terminal device or the SMF network element in steps S1101 to S1107 may be performed by the processor 901 in the communications device 900 shown in FIG. 9 by invoking the application program code stored in the memory 903. This is not limited in this embodiment.

Optionally, for example, the communications system shown in FIG. 3 is applied to the 5G network architecture in the non-roaming scenario shown in FIG. 6a or FIG. 6b, and the SMF network element sends survival time information to the RAN device through a control plane. An embodiment of this application further provides another service continuity implementation method. The service continuity implementation method is similar to the service continuity implementation method shown in FIGS. 10A and 10B, and includes the following steps.

S1201 to S1206: Same as steps S1001 to S006 in the embodiment shown in FIGS. 10A and 10B. For related descriptions, refer to the embodiment shown in FIGS. 10A and 10B. Details are not described herein again.

S1207: The PCF network element sends a message 5 to the SMF network element. The SMF network element receives the message 5 from the PCF network element.

For example, the message 5 may be the session management policy establishment response (session management policy establishment response) in FIGS. 10A and 10B.

The message 5 includes a PCC rule, the PCC rule includes a QoS identifier, and a QoS attribute corresponding to the QoS identifier includes first survival time information. The first survival time information indicates duration of a service that survives when a correct data packet is not received.

Optionally, the first survival time information may be, for example, survival time 1 or an identifier of the survival time 1.

For example, the QoS identifier in this embodiment of this application may be a 5QI (an example in which the QoS identifier is the 5QI is used for description in the following embodiments of this application). In other words, in this embodiment of this application, the QoS attribute corresponding to the 5QI includes the first survival time information. Assuming that the first survival time information is the survival time 1, the QoS attribute corresponding to the 5QI may be shown in Table 1.

TABLE 1

| 5QI value (value) | Resource type (resource type) | Default priority level (default priority level) | PDB | Survival time 1 (survival time 1) | ... |
|---|---|---|---|---|---|
| 10 | Delay critical | 11 | 5 ms | 10 ms | ... |
| 11 NOTE 4 | GBR | 12 | 10 ms NOTE 5 | 14 ms | ... |
| 12 | | 13 | 20 ms | ... | ... |
| 16 NOTE 4 | | 18 | 10 ms | ... | ... |
| 17 NOTE 4 | | 19 | 10 ms | ... | ... |
| 1 | GBR | 20 | 100 ms | ... | ... |
| 2 | NOTE 1 | 40 | 150 ms | ... | ... |
| 3 | | 30 | 50 ms | ... | ... |
| 4 | | 50 | 300 ms | ... | ... |

It should be noted that Table 1 merely provides examples of some QoS attributes corresponding to the 5QI, such as the resource type, the default priority level, the PDB, and the survival time 1. Certainly, the 5QI may further correspond to another QoS attribute, such as a packet error rate (packet error rate) or a default averaging window (default averaging window). For details, refer to an existing implementation. Details are not described herein. In addition, it should be noted that if survival time information corresponding to a standardized 5QI needs to be modified or a non-standardized 5QI needs to be delivered, the 5QI and the corresponding survival time information are simultaneously delivered.

S1208: The SMF network element determines the first survival time information as a binding parameter of a QoS flow.

To be specific, the SMF network element considers the first survival time information when performing QoS flow binding (QoS flow binding). QoS flow binding is the association of a PCC rule to a QoS flow within a PDU session. In this embodiment of this application, the binding is performed using the following binding parameters.

1. 5QI: The QoS attribute corresponding to the 5QI in this embodiment of this application includes the first survival time information. For other related descriptions, refer to the brief description part in the background. Details are not described herein again.
2. ARP: For related descriptions, refer to the brief description part in the background. Details are not described herein again.

Optionally, if the PCC rule includes one or more of the following parameters, the one or more of the following parameters may also be used as the binding parameter:

3. QoS notification control: For related descriptions, refer to the brief description part in the background. Details are not described herein again.
4. Priority level: For related descriptions, refer to the brief description part in the background. Details are not described herein again.
5. Averaging window: For related descriptions, refer to the brief description part in the background. Details are not described herein again.
6. Maximum data burst volume: For related descriptions, refer to the brief description part in the background. Details are not described herein again.

Certainly, the first survival time information may also be separately used as the binding parameter, and is similar to another QoS attribute such as the priority level, the averaging window, or the maximum data burst volume included in the 5QI. This is not specifically limited herein.

After the SMF network element determines the first survival time information as the binding parameter of the QoS flow, all services in a same QoS flow have same survival time.

S1209: The SMF network element sends a message 6 to the PCF network element. The PCF network element receives the message 6 from the SMF network element. The message 6 includes session-related information. The session-related information may include, for example, an internet protocol (IP) address or an IP prefix of the terminal device. For a specific implementation, refer to an existing implementation. Details are not described herein.

For example, the message 6 may be the session management policy modification request (session management policy modification request) in FIGS. 10A and 10B.

S1210: The PCF network element sends a message 7 to the SMF network element. The SMF network element receives the message 7 from the PCF network element.

For example, the message 6 may be the session management policy modification response (session management policy modification response) in FIGS. 10A and 10B.

S1211: The SMF network element selects a UPF network element, and interacts with the UPF network element to establish an N4 session. For a specific implementation, refer to an existing implementation. Details are not described herein.

S1212: The SMF network element sends a message 8 to the AMF network element. The AMF network element receives the message 8 from the SMF network element.

For example, the message 8 may be the N1N2 message transfer (N1N2 message transfer) in FIGS. 10A and 10B.

The message 8 includes N2 SM information (N2 SM information) and an N1 SM container (N1 SM container). The N2 SM information is sent to a RAN device, and the AMF network element only forwards (or transparently transmits) the N2 SM information to the RAN device. The N1 SM container is sent to a terminal device, and both the AMF network element and the RAN device only forward (or transparently transmit) the N1 SM container to the terminal device.

The N2 SM information includes a QoS file (QoS profile), the QoS file includes a 5QI, and a QoS attribute corresponding to the 5QI includes second survival time information.

In this embodiment of this application, the second survival time information is the same as the first survival time information. If the first survival time information is the survival time 1, the second survival time information is the survival time 1. If the first survival time information is the identifier of the survival time 1, the second survival time information is the identifier of the survival time 1.

The N1 SM container includes a QoS rule (QoS rule). Optionally, the QoS rule includes a 5QI, and a QoS attribute corresponding to the 5QI includes third survival time information.

In this embodiment of this application, the third survival time information is the same as the first survival time information. If the first survival time information is the survival time 1, the third survival time information is the survival time 1. If the first survival time information is the identifier of the survival time 1, the third survival time information is the identifier of the survival time 1.

S1213: The AMF network element sends a message 9 to the RAN device. The RAN device receives the message 9 from the AMF network element.

For example, the message 9 may be the N2 PDU session request (N2 PDU session request) in FIGS. 10A and 10B.

The message 9 includes the N2 SM information and the N1 SM container.

S1214: The RAN device schedules a data packet based on the second survival time information in the QoS profile included in the N2 SM information.

For a specific implementation of step S1214, refer to the embodiment shown in FIGS. 10A and 10B. Details are not described herein again.

S1215: The RAN device sends a message 10 to the terminal device. The terminal device receives the message 10 from the RAN device.

For example, the message 10 may be the PDU session establishment accept (PDU session establishment accept) in FIGS. 10A and 10B.

For a specific implementation of step S1215, refer to the embodiment shown in FIGS. 10A and 10B Details are not described herein again.

S1216: Same as step S1016 in the embodiment shown in FIGS. 10A and 10B. For related descriptions, refer to the embodiment shown in FIGS. 10A and 10B. Details are not described herein again.

In an application layer data packet transmission process, the service continuity implementation method provided in this embodiment of this application can avoid problems that an application layer is interrupted and a normal application layer service is affected because a network layer does not transmit an application layer data packet based on a QoS requirement of an application layer service, and can ensure service continuity. For analysis of related technical effects, refer to the foregoing communications system part. Details are not described herein again.

The actions of the terminal device or the SMF network element in steps S1201 to S1216 may be performed by the processor 901 in the communications device 900 shown in FIG. 9 by invoking the application program code stored in the memory 903. This is not limited in this embodiment.

Optionally, the PCF network element in the embodiment shown in steps S1201 to S1216 may initiate a change of survival time information. In this case, when performing QoS flow binding, the SMF network element needs to update the survival time information in the binding parameter of the QoS flow, and the RAN device also needs to update corresponding survival time information. Specifically, a service continuity implementation method in this scenario is similar to the service continuity implementation method shown in FIG. 11, and includes the following steps.

S1301: A PCF network element initiates a PCC rule modification procedure to an SMF network element.

For the PCC rule modification procedure, refer to an existing implementation. Details are not described herein.

In this embodiment of this application, a modified PCC rule includes an updated 5QI, and a QoS attribute corresponding to the 5QI includes updated survival time 1 or an identifier of the updated survival time 1.

S1302: The SMF network element updates first survival time information in a QoS attribute corresponding to a 5QI in a binding parameter of a QoS flow.

To be specific, the SMF network element replaces the first survival time information in the QoS attribute corresponding to the 5QI in the binding parameter of the QoS flow with the updated survival time 1 or the identifier of the updated survival time 1.

S1303: The SMF network element sends a message 8 to an AMF network element. The AMF network element receives the message 8 from the SMF network element.

For example, the message 8 may be the N1N2 message transfer (N1N2 message transfer) in FIG. 11.

The message 8 includes N2 SM information and an N1 SM container. The N2 SM information is sent to a RAN device, and the AMF network element only forwards (or transparently transmits) the N2 SM information to the RAN device. The N1 SM container is sent to a terminal device, and both the AMF network element and the RAN device only forward (or transparently transmit) the N1 SM container to the terminal device.

Optionally, in this embodiment of this application, when the SMF network element determines to delete a GBR QoS flow, the N2 SM information includes a PDU session ID and a QFI, and the N1 SM container includes a PDU session ID, an affected QoS rule, and a corresponding QoS rule operation (that is, deletion). When the SMF network element determines to modify a QoS flow, the N2 SM information includes a PDU session ID, a QFI, and a QoS profile, and the N1 SM container includes a PDU session ID, an affected QoS rule, and a corresponding QoS rule operation (such as deletion or modification). The QoS profile herein includes the updated 5QI. Optionally, the QoS rule herein includes the updated 5QI.

S1304: The AMF network element sends a message 9 to the RAN device. The RAN device receives the message 9 from the AMF network element.

For example, the message 9 may be an N2 PDU session request in FIG. 11.

The message 9 includes the N2 SM information and the N1 SM container.

S1305: The RAN device schedules a data packet based on the updated survival time 1 or the identifier of the updated survival time 1 in the QoS profile included in the N2 SM information.

Optionally, if the QoS attribute corresponding to the updated 5QI included in the QoS profile includes the identifier of the updated survival time 1, the RAN device may determine the corresponding updated survival time 1 based on the identifier of the updated survival time 1 and a correspondence between the identifier of the updated survival time 1 and the updated survival time 1, and further schedules the data packet based on the updated survival time 1.

For a related implementation in which the RAN device schedules the data packet based on the updated survival time 1, refer to the related example in the communications system part. Details are not described herein again.

S1306: The RAN device and the terminal device perform a RAN-specific resource modification (RAN-specific resource modification) procedure. For details, refer to an existing implementation. Details are not described herein.

In this embodiment of this application, in a process in which the RAN device and the terminal device perform the RAN-specific resource modification procedure, the RAN device may send the N1 SM container to the terminal device. Optionally, if the QoS rule included in the N1 SM container includes the updated 5QI, the terminal device may schedule a data packet based on the updated survival time 1 or the identifier of the updated survival time 1 included in the QoS attribute corresponding to the 5QI.

Optionally, if the QoS attribute corresponding to the updated 5QI in the QoS rule includes the identifier of the updated survival time 1, the terminal device may determine the corresponding updated survival time 1 based on the identifier of the updated survival time 1 and a correspondence between the identifier of the updated survival time 1 and the updated survival time 1, and further schedules a data packet based on the updated survival time 1. For a related implementation in which the terminal device schedules the data packet based on the updated survival time 1, refer to the related example in the communications system part. Details are not described herein again.

S1307: Same as step S1107 in the embodiment shown in FIG. 11. For related descriptions, refer to the embodiment shown in FIG. 11. Details are not described herein again.

In an application layer data packet transmission process, the service continuity implementation method provided in this embodiment of this application can avoid problems that an application layer is interrupted and a normal application layer service is affected because a network layer does not transmit an application layer data packet based on a QoS requirement of an application layer service, and can ensure service continuity. For analysis of related technical effects, refer to the foregoing communications system part. Details are not described herein again. In addition, based on the service continuity implementation method provided in this embodiment of this application, the survival time information can be further updated in a timely manner.

The actions of the terminal device or the SMF network element in steps S1301 to S1307 may be performed by the processor 901 in the communications device 900 shown in FIG. 9 by invoking the application program code stored in the memory 903. This is not limited in this embodiment.

Figure 12A:
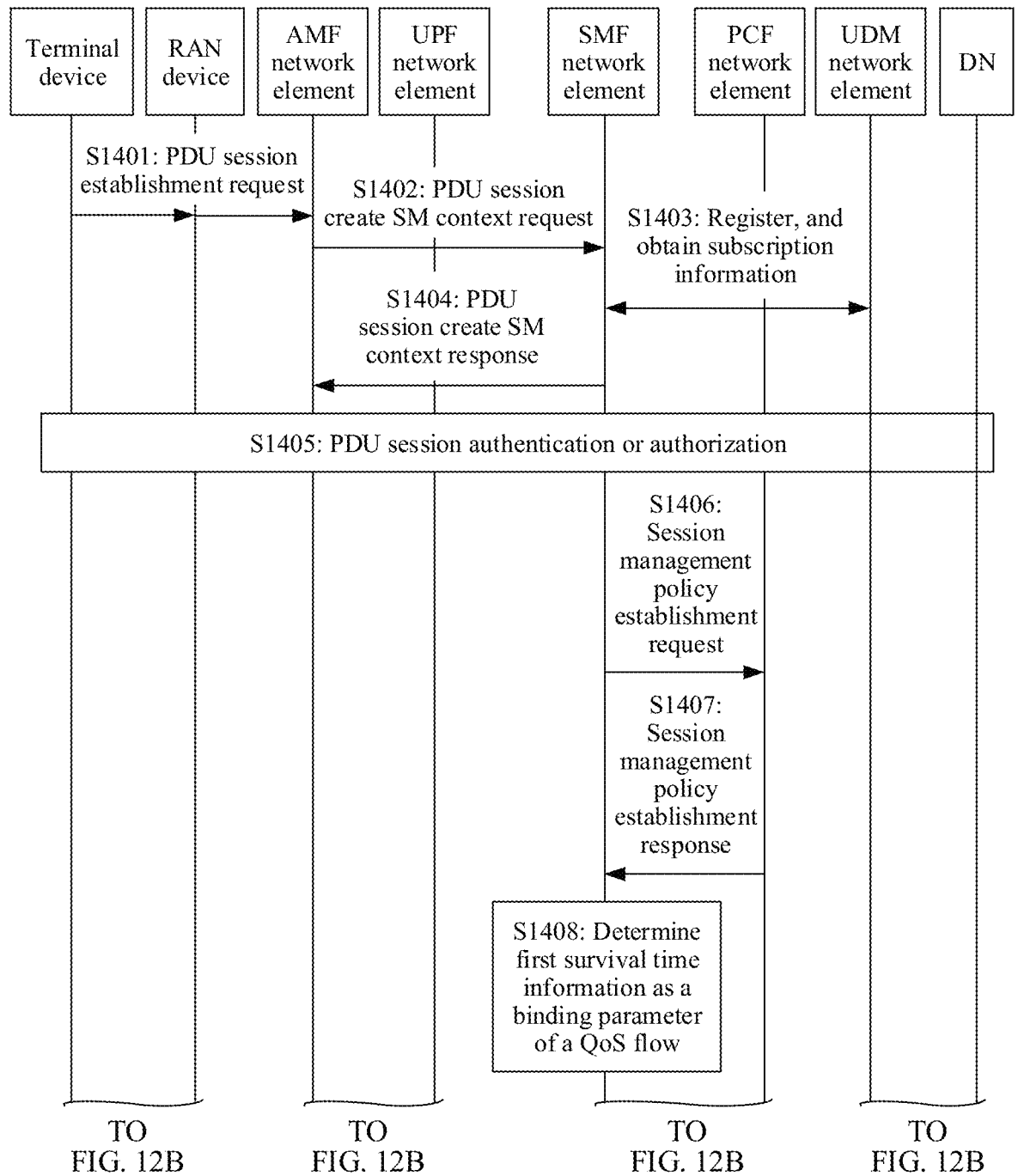
FIGS. 12A and 12B are a schematic flowchart 3 of a service continuity implementation method according to an embodiment of this application.
Figure 12B:
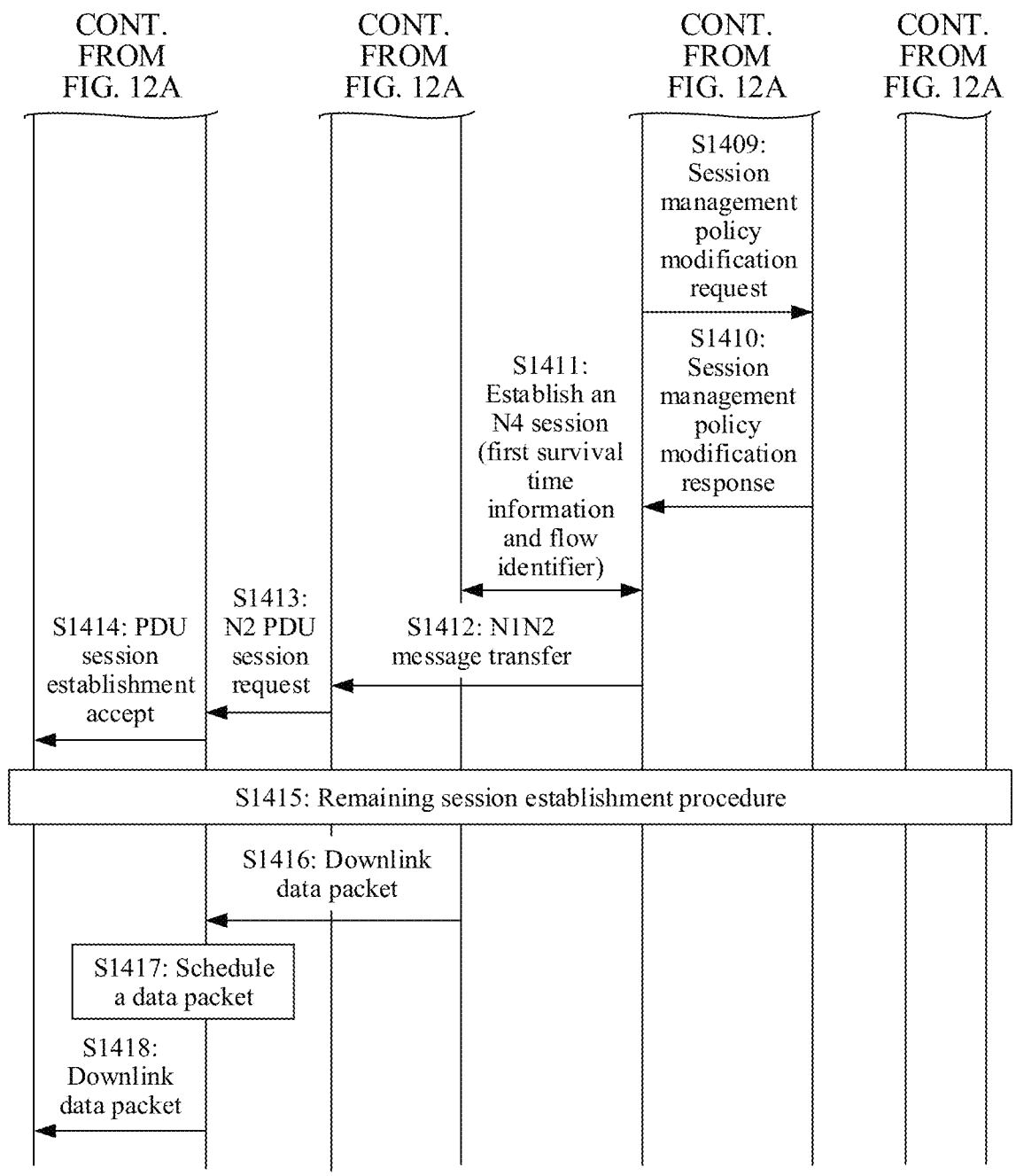

Alternatively, optionally, for example, the communications system shown in FIG. 3 is applied to the 5G network architecture in the non-roaming scenario shown in FIG. 6a or FIG. 6b, and the SMF network element sends survival time information to the RAN device through a user plane. FIGS. 12A and 12B show another service continuity implementation method according to an embodiment of this application. The service continuity implementation method includes the following steps.

S1401 to S1410: Same as steps S1001 to S010 in the embodiment shown in FIGS. 10A and 10B. For related descriptions, refer to the embodiment shown in FIGS. 10A and 10B. Details are not described herein again.

S1411: The SMF network element selects a UPF network element, and interacts with the UPF network element to establish an N4 session. For a specific implementation, refer to an existing implementation. Details are not described herein.

In addition, in this embodiment of this application, in a process in which the SMF network element interacts with the UPF network element to establish the N4 session, the SMF network element may further send second survival time information and flow identifier information to the UPF network element. The second survival time information indicates the duration indicated by the first survival time information.

Optionally, the second survival time information may be, for example, the survival time 1 or the identifier of the survival time 1.

Optionally, in this embodiment of this application, if the PCC rule includes the survival time 1, the SMF network element may determine the identifier of the corresponding survival time 1 based on the survival time 1 and a correspondence between the identifier of the survival time 1 and the survival time 1, and may further send the identifier of the survival time 1 to the UPF network element.

Optionally, in this embodiment of this application, if the PCC rule includes the identifier of the survival time 1, the SMF network element may determine the corresponding survival time 1 based on the identifier of the survival time 1 and a correspondence between the identifier of the survival time 1 and the survival time 1, and may further send the survival time 1 to the UPF network element.

Optionally, in this embodiment of this application, when a granularity of a data packet is a service data flow (service data flow) level, a flow identifier may be a service identifier, indicating that this data packet belongs to a service. When a granularity of a data packet is a QoS flow level, a flow identifier may be a QFI, indicating that this data packet belongs to a QoS flow. Unified descriptions are provided herein, and details are not described below again.

S1412: The SMF network element sends a message 8 to an AMF network element. The AMF network element receives the message 8 from the SMF network element.

For example, the message 8 may be N1N2 message transfer (N1N2 message transfer) in FIGS. 12A and 12B.

The message 8 includes N2 SM information (N2 SM Information) and an N1 SM container (N1 SM container). The N2 SM information is sent to a RAN device, and the AMF network element only forwards (or transparently transmits) the N2 SM information to the RAN device. The N1 SM container is sent to a terminal device, and both the AMF network element and the RAN device only forward (or transparently transmit) the N1 SM container to the terminal device.

The N2 SM information includes a QoS profile (QoS profile), and the N1 SM container includes a QoS rule (QoS rule). For a related implementation, refer to an existing implementation. Details are not described herein.

S1413: The AMF network element sends a message 9 to the RAN device. The RAN device receives the message 9 from the AMF network element.

For example, the message 9 may be an N2 PDU session request (N2 PDU session request) in FIGS. 12A and 12B.

The message 9 includes the N2 SM information and the N1 SM container.

S1414: The RAN device sends a message 10 to the terminal device. The terminal device receives the message 10 from the RAN device.

For example, the message 10 may be PDU session establishment accept (PDU session establishment accept) in FIGS. 12A and 12B.

The message 10 includes the N1 SM container. For a related implementation, refer to an existing implementation. Details are not described herein.

S1415: Complete a remaining session establishment procedure.

S1416: The UPF network element sends a downlink data packet to the access network device. Correspondingly, the access network device receives the downlink data packet from the UPF.

Figure 13:
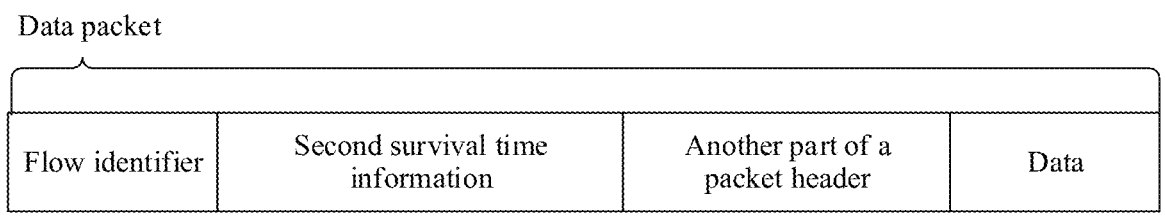
FIG. 13 is a schematic composition diagram of a downlink data packet according to an embodiment of this application.

The downlink data packet includes the second survival time information and the flow identifier, and has a format shown in FIG. 13.

S1417: The RAN device schedules a data packet based on the second survival time information in the downlink data packet.

Optionally, if the second survival time information is the survival time 1, the RAN device schedules the data packet based on the survival time 1.

Optionally, if the second survival time information is the identifier of the survival time 1, the RAN device may determine the corresponding survival time 1 based on the identifier of the survival time 1 and a correspondence between the identifier of the survival time 1 and the survival time 1, and further schedules the data packet based on the survival time 1.

For a related implementation in which the RAN device schedules the data packet based on the survival time 1, refer to the related example in the communications system part. Details are not described herein again.

S1418: The RAN device sends the downlink data packet to the terminal device. The terminal device receives the downlink data packet from the RAN device.

Optionally, in this embodiment of this application, if the downlink data packet includes the second survival time information, the terminal device may schedule a data packet based on the second survival time information. For a related implementation, refer to the embodiment shown in FIGS. 10A and 10B. Details are not described herein again.

Optionally, in this embodiment of this application, third survival time information may be carried in the QoS rule in the N1 SM container. The third survival time information indicates the duration indicated by the first survival time information. Further, the terminal device may schedule a data packet based on the third survival time information. For a related implementation, refer to the embodiment shown in FIGS. 10A and 10B. Details are not described herein again.

In addition, optionally, the terminal device may mark, based on the second survival time information in the downlink data packet or the third survival time information in the QoS rule, an uplink data packet sent by the terminal device to the UPF network element, for example, use the uplink data packet to carry the survival time 1 or the identifier of the survival time 1. This is not specifically limited herein. For a format of the uplink data packet, refer to the format of the downlink data packet in FIG. 13. Details are not described herein again.

It should be noted that, in the foregoing embodiment in which the SMF network element sends the survival time information to the RAN device through the control plane, an encapsulation format of the uplink data packet or the downlink data packet may also be used in a subsequent data transmission phase. Unified descriptions are provided herein, and details are not described below again.

In an application layer data packet transmission process, the service continuity implementation method provided in this embodiment of this application can avoid problems that an application layer is interrupted and a normal application layer service is affected because a network layer does not transmit an application layer data packet based on a QoS requirement of an application layer service, and can ensure service continuity. For analysis of related technical effects, refer to the foregoing communications system part. Details are not described herein again.

The actions of the terminal device or the SMF network element in steps S1401 to S1418 may be performed by the processor 901 in the communications device 900 shown in FIG. 9 by invoking the application program code stored in the memory 903. This is not limited in this embodiment.

Optionally, the PCF network element in the embodiment shown in FIG. 12A and FIG. 12B may initiate a change of survival time information. In this case, when performing QoS flow binding, the SMF network element needs to update the survival time information in the binding parameter of the QoS flow, and the RAN device also needs to update corresponding survival time information. Specifically, a service continuity implementation method in this scenario is shown in FIG. 14, and includes the following steps.

S1601 and S1602: Same as steps S1101 and S1102 in the embodiment shown in FIG. 11. For related descriptions, refer to the embodiment shown in FIG. 11. Details are not described herein again.

S1603: The SMF network element sends a message 11 to a UPF network element. The UPF network element receives the message 11 from the SMF network element.

Figure 14:
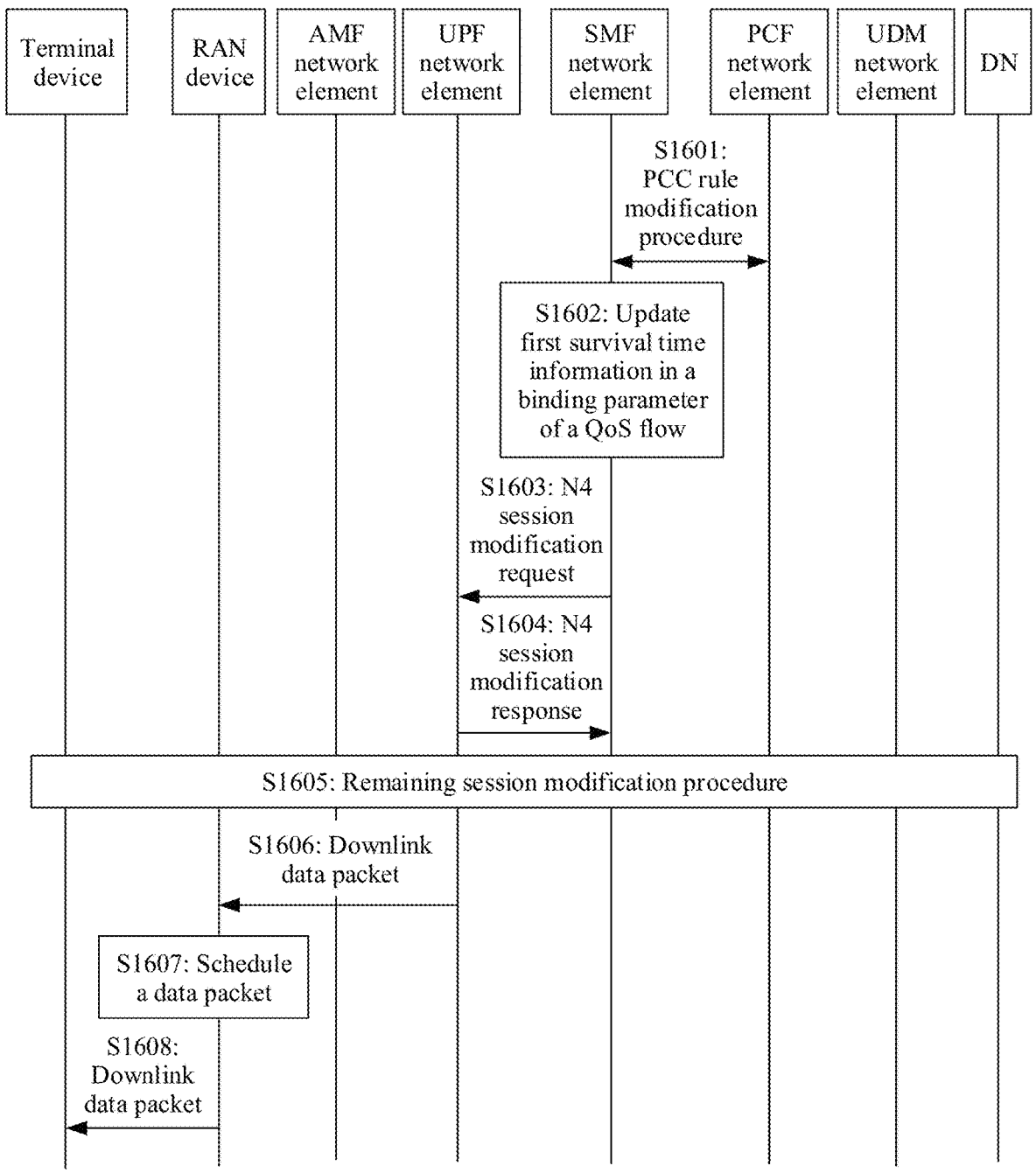
FIG. 14 is a schematic flowchart 4 of a service continuity implementation method according to an embodiment of this application.

For example, the message 11 may be an N4 session modification request (N4 session modification request) in FIG. 14.

The message 11 includes updated survival time 1 or an identifier of the updated survival time 1.

S1604: The UPF network element sends a message 12 to the SMF network element. The SMF network element receives the message 12 from the UPF network element.

For example, the message 12 may be an N4 session modification response (N4 session modification response) in FIG. 14.

S1605: Complete a remaining session modification procedure.

S1606: The UPF network element sends a downlink data packet to an access network device. Correspondingly, the access network device receives the downlink data packet from the UPF.

The downlink data packet includes the updated survival time 1 or the identifier of the updated survival time 1, and has a format shown in FIG. 13.

S1607: The RAN device schedules a data packet based on the updated survival time 1 or the identifier of the updated survival time 1 in the downlink data packet.

Optionally, if the downlink data packet includes the identifier of the updated survival time 1, the RAN device may determine the corresponding updated survival time 1 based on the identifier of the updated survival time 1 and a correspondence between the identifier of the survival time 1 and the survival time 1, and further schedules the data packet based on the updated survival time 1.

For a related implementation in which the RAN device schedules the data packet based on the survival time 1, refer to the related example in the communications system part. Details are not described herein again.

S1608: The RAN device sends the downlink data packet to the terminal device. The terminal device receives the downlink data packet from the RAN device.

Optionally, in this embodiment of this application, if the downlink data packet includes the updated survival time 1 or the identifier of the updated survival time 1, the terminal device may schedule a data packet based on the updated survival time 1 or the identifier of the updated survival time 1. For a related implementation, refer to the embodiment shown in FIGS. 10A and 10B. Details are not described herein again.

Optionally, in this embodiment of this application, the updated survival time 1 or the identifier of the updated survival time 1 may be carried in a QoS rule in an N1 SM container. Further, the terminal device may schedule a data packet based on the updated survival time 1 or the identifier of the updated survival time 1. For a related implementation, refer to the embodiment shown in FIGS. 10A and 10B. Details are not described herein again.

In addition, optionally, the terminal device may mark, based on the updated survival time 1 or the identifier of the updated survival time 1 in the downlink data packet or in the QoS rule, an uplink data packet sent by the terminal device to the UPF network element, for example, use the uplink data packet to carry the updated survival time 1 or the identifier of the updated survival time 1. This is not specifically limited herein.

In an application layer data packet transmission process, the service continuity implementation method provided in this embodiment of this application can avoid problems that an application layer is interrupted and a normal application layer service is affected because a network layer does not transmit an application layer data packet based on a QoS requirement of an application layer service, and can ensure service continuity. For analysis of related technical effects, refer to the foregoing communications system part. Details are not described herein again. In addition, based on the service continuity implementation method provided in this embodiment of this application, the survival time information can be further updated in a timely manner.

The actions of the terminal device or the SMF network element in steps S1601 to S1608 may be performed by the processor 901 in the communications device 900 shown in FIG. 9 by invoking the application program code stored in the memory 903. This is not limited in this embodiment.

Optionally, in the embodiment shown in FIGS. 12A and 12B, when the PCF network element sends the PCC rule to the SMF network element, the QoS attribute corresponding to the 5QI in the PCC rule may alternatively include the first survival time information. When the SMF network element sends the QoS rule to the terminal device, the QoS rule may alternatively include the 5QI, and the QoS attribute corresponding to the 5QI includes the third survival time information. For other related descriptions, refer to the embodiment shown in FIGS. 12A and 12B. Details are not described herein again.

Similarly, in the embodiment shown in FIG. 14, in the PCC rule modification procedure, the QoS attribute corresponding to the updated 5QI may alternatively include the updated survival time 1 or the identifier of the updated survival time 1. When the SMF network element sends the QoS rule to the terminal device, the QoS rule may alternatively include the updated 5QI, and the QoS attribute corresponding to the updated 5QI includes the updated survival time 1 or the identifier of the updated survival time 1. For other related descriptions, refer to the embodiment shown in FIG. 14. Details are not described herein again.

It should be noted that the embodiments shown in FIGS. 10A and 10B to FIG. 14 are all described by using an example in which the communications system shown in FIG. 3 is applied to the 5G network architecture in the non-roaming scenario shown in FIG. 6a or FIG. 6b. If descriptions are provided by using an example in which the communications system shown in FIG. 3 is applied to the local breakout roaming 5G network architecture shown in FIG. 7a or FIG. 7b, or descriptions are provided by using an example in which the communications system shown in FIG. 3 is applied to the home routed roaming 5G network architecture shown in FIG. 8a or FIG. 8b, a corresponding service continuity implementation method is similar to the method in the foregoing embodiment, and only a related network element needs to be adaptively replaced. Details are not described herein.

It may be understood that in the foregoing embodiments, methods and/or steps implemented by the terminal device may alternatively be implemented by a component (for example, a chip or a circuit) that can be used in the terminal device, and methods and/or steps implemented by the session management network element may alternatively be implemented by a component that can be used in the session management network element.

The foregoing mainly describes the solutions provided in the embodiments of this application from a perspective of interaction between the network elements. Correspondingly, an embodiment of this application further provides a communications apparatus, and the communications apparatus is configured to implement the foregoing methods. The communications apparatus may be the terminal device in the foregoing method embodiments, an apparatus including the terminal device, or a component that can be used in the terminal device. Alternatively, the communications apparatus may be the session management network element in the foregoing method embodiments, an apparatus including the session management network element, or a component that can be used in the session management network element. It can be understood that to implement the foregoing functions, the communications apparatus includes a corresponding hardware structure and/or software module for performing the functions. A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be other division in an actual implementation.

Figure 15:
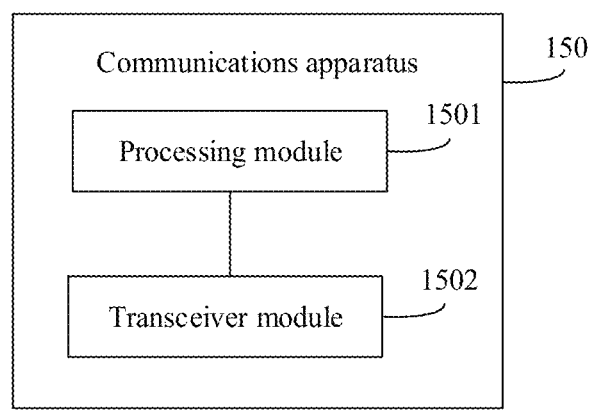
FIG. 15 is a schematic structural diagram of a communications apparatus according to an embodiment of this application.

For example, FIG. 15 is a schematic structural diagram of a communications apparatus 150. The communications apparatus 150 includes a processing module 1501 and a transceiver module 1502. The transceiver module 1502 may also be referred to as a transceiver unit, and is configured to implement a sending function and/or a receiving function. For example, the transceiver module 1502 may be a transceiver circuit, a transceiver, a transceiver, or a communications interface.

For example, the communications apparatus 150 is the session management network element in the foregoing method embodiments.

The transceiver module 1502 is configured to receive first survival time information from a policy control network element, where the first survival time information indicates duration of a service that survives when a correct data packet is not received. The processing module 1501 is configured to determine the first survival time information as a binding parameter of a QoS flow. The transceiver module 1502 is further configured to send second survival time information to an access network device, where the second survival time information is used to indicate the duration, and the second survival time information is used by the access network device to schedule a data packet.

In a possible implementation, that the transceiver module 1502 is configured to receive first survival time information from a policy control network element includes: receiving a PCC rule from the policy control network element, where the PCC rule includes the first survival time information.

In another possible implementation, that the transceiver module 1502 is configured to receive first survival time information from a policy control network element includes: receiving a PCC rule from the policy control network element, where the PCC rule includes a QoS identifier, and a QoS attribute corresponding to the QoS identifier includes the first survival time information.

Optionally, that the transceiver module 1502 is configured to send second survival time information to an access network device includes: sending a QoS file to the access network device, where the QoS file includes the second survival time information.

Optionally, that the transceiver module 1502 is configured to send second survival time information to an access network device includes: sending the second survival time information to a user plane network element, where the user plane network element uses a downlink data packet to be sent to the access network device to carry the second survival time information.

Optionally, the transceiver module 1502 is further configured to send a QoS rule to a terminal device, where the QoS rule includes third survival time information, the third survival time information is used to indicate the duration, and the third survival time information in the QoS rule is used by the terminal device to schedule a data packet.

Alternatively, for example, the communications apparatus 150 is the terminal device in the foregoing method embodiments.

The transceiver module 1602 is configured to receive survival time information from an access network device, where the survival time information indicates duration of a service that survives when a correct data packet is not received. The processing module 1501 is configured to schedule a data packet based on the survival time formation.

Optionally, that the transceiver module 1502 is configured to receive survival time information from an access network device includes: receiving a QoS rule from the access network device, where the QoS rule includes the survival time information, and the QoS rule is sent by a mobility management network element to the access network device.

Optionally, that the transceiver module 1502 is configured to receive survival time information from an access network device includes: receiving a downlink data packet from the access network device, where the downlink data packet includes the survival time information.

Optionally, the transceiver module 1502 is further configured to send an uplink data packet to the access network device, where the uplink data packet includes the survival time information.

All related content of the steps in the foregoing method embodiments may be cited in function descriptions of corresponding functional modules. Details are not described herein again.

In this embodiment, the communications apparatus 150 is presented in a form of functional modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, a person skilled in the art may figure out that the communications apparatus 150 may be in a form of the communications device 900 shown in FIG. 9.

For example, the processor 901 in the communications device 900 shown in FIG. 9 may invoke the computer execution instructions stored in the memory 903, so that the communications device 900 performs the service continuity implementation method in the foregoing method embodiments.

Specifically, functions/implementation processes of the processing module 1501 and the transceiver module 1502 in FIG. 15 may be implemented by the processor 901 in the communications device 900 shown in FIG. 9 by invoking the computer execution instructions stored in the memory 903. Alternatively, a function/an implementation process of the processing module 1501 in FIG. 15 may be implemented by the processor 901 in the communications device 900 shown in FIG. 9 by invoking the computer execution instructions stored in the memory 903, and a function/an implementation process of the transceiver module 1502 in FIG. 15 may be implemented through the communications interface 904 in the communications device 900 shown in FIG. 9.

The communications apparatus 150 provided in this embodiment may perform the foregoing service continuity implementation method. Therefore, for technical effects that can be achieved by the communications apparatus 150, refer to the foregoing method embodiments. Details are not described herein again.

It should be noted that one or more of the foregoing modules or units may be implemented by using software, hardware, or a combination thereof. When any one of the foregoing modules or units is implemented by software, the software exists in a form of computer program instructions that are stored in a memory. The processor may be configured to execute the program instructions to implement the foregoing method procedures. The processor may be built in an SoC (system-on-a-chip) or an ASIC, or may be an independent semiconductor chip. In addition to a core used to perform an operation or processing by executing the software instructions, the processor may further include a necessary hardware accelerator, for example, a field programmable gate array (FPGA), a PLD (programmable logic device), or a logic circuit that implements a dedicated logic operation.

When the foregoing modules or units are implemented by using hardware, the hardware may be any one of or any combination of a CPU, a microprocessor, a digital signal processing (DSP) chip, a microcontroller unit (MCU), an artificial intelligence processor, an ASIC, an SoC, an FPGA, a PLD, a dedicated digital circuit, a hardware accelerator, or a non-integrated discrete component, and the hardware may run necessary software or does not depend on software, to perform the foregoing method procedures.

Optionally, an embodiment of this application further provides a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store necessary program instructions and necessary data. The processor may invoke the program code stored in the memory, to indicate the communications apparatus to perform the method in any one of the foregoing method embodiments. Certainly, the communications apparatus may not include a memory. When the communications apparatus is the chip system, the communications apparatus may include a chip, or may include a chip and another discrete component. This is not specifically limited in this embodiment of this application.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the term "comprising" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to this application without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. A service continuity implementation method, comprising:
   receiving, by a session management network element, first survival time information from a policy control network element, wherein the first survival time information indicates duration of a service that survives when a correct data packet is not received;
   performing, by the session management network element, a quality of service (QoS) flow binding based on the first survival time information; and
   sending, by the session management network element, second survival time information to an access network device for the access network device to schedule a data packet based on the second survival time information, wherein the second survival time information indicates the duration.

2. The method according to claim 1, wherein
   the first survival time information comprises survival time or an identifier of the survival time, and
   the second survival time information comprises the survival time or the identifier of the survival time.

3. The method according to claim 1, wherein the receiving, by the session management network element, the first survival time information from the policy control network element comprises:
   receiving, by the session management network element, a policy charging and control (PCC) rule from the policy control network element, wherein the PCC rule comprises the first survival time information.

4. The method according to claim 1, wherein the receiving, by the session management network element, the first survival time information from the policy control network element comprises:
   receiving, by the session management network element, a policy charging and control (PCC) rule from the policy control network element, wherein
   the PCC rule comprises a QoS identifier, and
   a QoS attribute corresponding to the QoS identifier comprises the first survival time information.

5. The method according to claim 3, wherein the PCC rule is an updated PCC rule, and the first survival time information is updated survival time information.

6. The method according to claim 1, wherein the performing, by the session management network element, the QoS flow binding based on the first survival time information comprises:
   binding, by the session management network element, different applications to different QoS flows by using the first survival time information.

7. A communications apparatus, comprising:
   at least one processor; and
   a non-transitory computer-readable storage medium coupled to the at least one processor and configured to store instructions for execution by the at least one processor, wherein the instructions, when executed, cause the communications apparatus to:
   receive first survival time information from a policy control network element, wherein the first survival time information indicates duration of a service that survives when a correct data packet is not received,
   perform a quality of service (QOS) flow binding based on the first survival time information, and
   send second survival time information to an access network device for the access network device to schedule a data packet based on the second survival time information, wherein the second survival time information indicates the duration.

8. The communications apparatus according to claim 7, wherein the instructions, when executed, cause the communications apparatus to:
   receive a policy charging and control (PCC) rule from the policy control network element, wherein the PCC rule comprises the first survival time information.

9. The communications apparatus according to claim 7, wherein the instructions, when executed, cause the communications apparatus to:
   receive a policy charging and control (PCC) rule from the policy control network element, wherein
   the PCC rule comprises a QoS identifier, and
   a QoS attribute corresponding to the QoS identifier comprises the first survival time information.

10. The apparatus according to claim 7, wherein the instructions, when executed, cause the communications apparatus to perform the QoS flow binding based on the first survival time information by:
    binding different applications to different QoS flows by using the first survival time information.

11. The apparatus according to claim 7, wherein
    the first survival time information comprises survival time or an identifier of the survival time, and
    the second survival time information comprises the survival time or the identifier of the survival time.

12. A communications system, comprising:
    a session management network element; and
    an access network device, wherein
    the session management network element is configured to:
      receive first survival time information from a policy control network element, wherein the first survival time information indicates duration of a service that survives when a correct data packet is not received,
      perform a quality of service (QOS) flow binding based on the first survival time information, and
      send second survival time information to the access network device, wherein the second survival time information indicates the duration, and
    the access network device is configured to:
      receive the second survival time information from the session management network element, and
      schedule a data packet based on the second survival time information.

13. The communications system according to claim 12, wherein the session management network element is further configured to receive a policy charging and control (PCC) rule from the policy control network element, and the PCC rule comprises the first survival time information.

14. The communications system according to claim 12, wherein the session management network element is further configured to receive a PCC rule from the policy control network element, the PCC rule comprises a QoS identifier, and a QoS attribute corresponding to the QoS identifier comprises the first survival time information.

15. The communications system according to claim 12, wherein the session management network element is configured to perform the QoS flow binding based on the first survival time information by:

binding different applications to different QoS flows by using the first survival time information.

16. The communications system according to claim 12, wherein the first survival time information comprises survival time or an identifier of the survival time, and the second survival time information comprises the survival time or the identifier of the survival time.

17. The communications system according to claim 12, further comprising:

the policy control network element configured to send the first survival time information to the session management network element.

18. A service continuity implementation method, comprising:

receiving, by a session management network element, first survival time information from policy control network element, wherein the first survival time information indicates duration of a service that survives when a correct data packet is not received;

performing, by the session management network element, a quality of service (QoS) flow binding based on the first survival time information;

sending, by the session management network element, second survival time information to an access network device for the access network device to schedule a data packet based on the second survival time information, wherein the second survival time information indicates the duration;

receiving, by the access network device, the second survival time information; and scheduling, by the access network device, the data packet based on the second survival time information.

19. The method according to claim 18, further comprising:

sending, by the policy control network element, a policy charging and control (PCC) rule to the session management network element, wherein the PCC rule comprises the first survival time information; and receiving, by the session management network element, the PCC rule from the policy control network element.

20. The method according to claim 18, further comprising:

sending, by the policy control network element, a policy charging and control (PCC) rule to the session management network element, wherein the PCC rule comprises a QoS identifier, and a QoS attribute corresponding to the QoS identifier comprises the first survival time information; and receiving, by the session management network element, the PCC rule from the policy control network element.

* * * * *